(12) United States Patent
Nishita

(10) Patent No.: US 12,716,722 B2
(45) Date of Patent: Aug. 25, 2026

(54) SURVEY SYSTEM

(71) Applicant: TOPCON CORPORATION, Tokyo (JP)

(72) Inventor: Nobuyuki Nishita, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 547 days.

(21) Appl. No.: 18/371,068

(22) Filed: Sep. 21, 2023

(65) Prior Publication Data

US 2024/0110783 A1 Apr. 4, 2024

(30) Foreign Application Priority Data

Sep. 29, 2022 (JP) ................................ 2022-157179

(51) Int. Cl.
*G01C 15/00* (2006.01)
*G01C 15/06* (2006.01)

(52) U.S. Cl.
CPC ........... *G01C 15/006* (2013.01); *G01C 15/06* (2013.01)

(58) Field of Classification Search
CPC .......... G01S 17/66; G01S 17/86; G01C 15/06
See application file for complete search history.

(56) References Cited

U.S. PATENT DOCUMENTS

2005/0189469 A1 9/2005 Sugiura
2009/0144995 A1* 6/2009 Yahagi .................... G01S 17/86 702/150
2014/0350886 A1 11/2014 Metzler
2015/0116693 A1* 4/2015 Ohtomo ............... G01C 15/002 356/4.01
2015/0177382 A1 6/2015 Vogel et al.
2015/0185008 A1* 7/2015 Nishita ................... G01S 17/66 33/293
2016/0216109 A1* 7/2016 Kumagai ............... H04N 7/181
2020/0011664 A1* 1/2020 Sasaki ..................... G01S 17/42
2022/0252396 A1 8/2022 Kikuchi
2023/0118766 A1* 4/2023 Rabin .................. G01B 11/005 356/634
2024/0110784 A1 4/2024 Sugiura et al.

FOREIGN PATENT DOCUMENTS

JP 2005-214854 A 8/2005
JP 2024-050349 A 4/2024
WO 2024/071287 A1 4/2024

* cited by examiner

*Primary Examiner* — Christopher D Hutchens
(74) *Attorney, Agent, or Firm* — Studebaker Brackett PLLC

(57) ABSTRACT

Provided is a new survey system capable of quickly locking on a target by a simple operation. The survey system includes a surveying instrument including an imaging unit configured to acquire an image in front of a telescope, a controller 80 including a GNSS device and configured to remotely operate the surveying instrument, and a target unit including a target and an optical transmitter, and based on position information acquired by the GNSS device in the vicinity of the target unit, the surveying instrument is rotated toward the GNSS device, images when the optical transmitter turns on light and turns off light are acquired by the imaging unit, and based on a difference image between the images, the surveying instrument is rotated toward the optical transmitter, scans the periphery by the tracking unit, and is locked on to the target.

16 Claims, 17 Drawing Sheets

16a
40
43b
41
29
Surveying instrument control unit
43a
Filter switch -ing device
44
42
43

SURVEY SYSTEM

CROSS-REFERENCE TO RELATED APPLICATION, BENEFIT CLAIM, AND INCORPORATION BY REFERENCE

The present application claims priority under 35 U.S.C. § 119 to Japanese Patent Application No. 2022-157179 filed Sep. 29, 2022. The contents of this application are incorporated herein by reference in their entirely.

TECHNICAL FIELD

The present invention relates to a survey system, more specifically, to a survey system using a surveying instrument having an automatic tracking function.

BACKGROUND ART

Conventionally, as a surveying instrument, one having a tracking function of automatically tracking a target such as a prism is known. A tracking unit includes a light transmitting unit and a light receiving unit such as an image sensor. The light transmitting unit transmits tracking light of a wavelength different from that of distance-measuring light, the light receiving unit acquires a landscape image when the tracking light is on and a landscape image when the tracking light is off. By performing an image analysis of a difference between the images, a center of the target is detected. Then, rotation of a telescope is controlled so that a deviation between the center of the target and a collimation axis of the telescope falls within a certain value. As a result, the target can be automatically tracked in such a manner that the telescope is always directed toward the target.

When starting tracking of the target, first, the surveying instrument has to detect the target and be locked on to the target. When tracking is lost due to a rapid movement of the target or obstruction by a vehicle or the like crossing between the target and the surveying instrument, the surveying instrument also has to be locked on to the target again.

In such a case, the tracking unit performs rotational scanning in the horizontal direction and the vertical direction by the telescope while emitting tracking light, and detects the target and locks on the target, and this takes time.

Patent Literature 1 discloses a system for locking on a target, including a surveying instrument, a pole with the target, and an optical transmitter. In Patent Literature 1, when tracking is lost, an operator gripping the pole with the target make the optical transmitter send a light signal to the surveying instrument. The surveying instrument receives the light signal by a plurality of light receiving units, detects a light signal arrival direction from a difference in amount of light received, and directs the telescope toward the light signal arrival direction. Then, by performing scanning in the vertical direction with the telescope, the surveying instrument can quickly lock on the target.

CITATION LIST

Patent Literature

Patent Literature 1 Japanese Published Unexamined Patent Application No. 2005-214854.

SUMMARY OF INVENTION

Technical Problems

However, in the system disclosed in Patent Literature 1, when tracking is lost, an operator has to once interrupt a survey work and direct the optical transmitter toward the surveying instrument, and then turn the switch of the optical transmitter on, and further, issue an instruction to the surveying instrument to search for the target. Therefore, a technique capable of locking on the target by a simpler operation has been demanded.

The present invention was made in view of the circumstances described above, and an object thereof is to provide a new survey system capable of quickly locking on a target by a simple operation.

Solution to Problem

In order to achieve the object described above, a survey system according to an aspect of the present invention has the following configuration.

1. A survey system includes a surveying instrument including a survey unit configured to transmit distance-measuring light to a target, and measure a distance and angles of the target by receiving the distance-measuring light reflected, a tracking unit configured to transmit tracking light to the target, detect a position of the target by receiving the tracking light reflected, and automatically track the target, a telescope storing optical systems of the survey unit and the tracking unit, a horizontal rotation driving unit configured to rotate the telescope in the horizontal direction and a vertical rotation driving unit configured to rotate the telescope in the vertical direction, an imaging unit configured to acquire an image of a landscape in front of the telescope, and a surveying instrument control unit configured to control the survey unit, the tracking unit, the horizontal rotation driving unit, the vertical rotation driving unit, and the imaging unit; a controller including a GNSS device configured to acquire position information of the device itself based on a navigation signal, and a controller control unit configured to remotely operate the surveying instrument; and a target unit including the target and an optical transmitter configured to emit tracking guide light, wherein the surveying instrument control unit and the controller control unit are capable of communicating with each other and function as a system control unit, the system control unit is enabled to calculate an azimuth of the GNSS device at an arbitrary point with respect to the surveying instrument based on position information acquired by the GNSS device at an installation point of the surveying instrument as a first point, position information acquired by the GNSS device at a second point away from the first point, and an azimuth from the surveying instrument to the second point acquired by the surveying instrument by measuring angles to the target set at the second point, the system control unit rotates the telescope in the horizontal direction toward the GNSS device based on a difference between an azimuth of the GNSS device at a current position with respect to the surveying instrument calculated from position information acquired by the GNSS device at the current position and an azimuth of a current collimation direction of the telescope, the surveying instrument control unit causes the imaging unit to acquire images when the optical transmitter turns off light and turns on light, calculates an arrival direction of the tracking guide light from a difference image between the images, and rotates the telescope toward the arrival direction, and by scanning the periphery by the tracking unit, the surveying instrument control unit captures the target and locks on the target.

A survey system according to another aspect of the present invention has the following configuration.

2. A survey system includes a surveying instrument including a survey unit configured to transmit distance-measuring light to a target, and measure a distance and angles of the target by receiving the distance-measuring light reflected, a tracking unit configured to transmit tracking light to the target, detect a position of the target by receiving the tracking light reflected, and automatically track the target, a telescope storing optical systems of the survey unit and the tracking unit, a horizontal rotation driving unit configured to rotate the telescope in the horizontal direction and a vertical rotation driving unit configured to rotate the telescope in the vertical direction, an imaging unit configured to acquire an image of a landscape in front of the telescope, and a surveying instrument control unit configured to control the survey unit, the tracking unit, the horizontal rotation driving unit, the vertical rotation driving unit, and the imaging unit; a controller including a GNSS device configured to acquire position information of the device itself based on a navigation signal, and a controller control unit configured to remotely operate the surveying instrument; and a target unit including the target and an optical transmitter configured to emit tracking guide light, wherein the surveying instrument control unit and the controller control unit are capable of communicating with each other, and function as a system control unit, the system control unit is enabled to calculate an azimuth of the GNSS device at an arbitrary point with respect to the surveying instrument based on position information acquired by the GNSS device at a first point away from an installation point of the surveying instrument, position information acquired by the GNSS device at a second point away from the first point, and an angle between the first point and the second point with respect to the surveying instrument acquired by respectively measuring angles of the target set at the first point and the second point by the surveying instrument, the system control unit rotates the telescope in the horizontal direction toward the GNSS device based on a difference between an azimuth of the GNSS device at a current position with respect to the surveying instrument calculated from position information acquired by the GNSS device at the current position, and an azimuth of a current collimation direction of the telescope, the surveying instrument control unit causes the imaging unit to acquire images when the optical transmitter turns off light and turns on light, calculates an arrival direction of the tracking guide light from a difference image between the images, and rotates the telescope toward the arrival direction, and by scanning the periphery by the tracking unit, the surveying instrument control unit captures the target and locks on the target.

3. In the configurations described in 1 and 2 above, it is also preferable that the optical transmitter emits light all around a central axis of a target support member supporting the target along a plane orthogonal to the central axis.

4. In the configurations described in 1 to 3 above, it is also preferable that the imaging unit repeats image acquisition at predetermined imaging intervals, the optical transmitter repeats flashing at intervals n times the imaging intervals, provided that n is a natural number of 2 or more, and the difference image is a difference image obtained by subtracting, from an image imaged at a certain timing, an image imaged n frames before the certain timing.

5. In the configuration described in 4 above, it is also preferable that the surveying instrument control unit monitors, as a synchronization point, a timing that is for imaging the image imaged at the certain timing so that the image becomes the image imaged when the optical transmitter is on light, and the image imaged n frames before the certain timing becomes the image imaged when the optical transmitter is off light in imaging for obtaining the difference image, and calculates the arrival direction of the tracking guide light from an average image of the difference images at a plurality of successive synchronization points.

6. In 4 described above, it is also preferable that the n is 2.

7. In 1 to 6 described above, scanning by the tracking unit is performed so as to preferentially scan a position in the vertical direction grasped from the arrival direction of the tracking guide light obtained from the difference image.

8. In 1 to 7 described above, it is also preferable that the surveying instrument further includes a rotary base including the horizontal rotation driving unit, a bracket portion erected on the rotary base and configured to support the telescope in a vertically rotatable manner, and a cover member storing the telescope, the bracket portion, and the imaging unit which is disposed at an upper end of the bracket portion in a space defined between the cover member and the rotary base, and in a front surface of the cover member, a window extending in the up-down direction is provided at a center and an imaging window configured not to obstruct a field of view of the imaging unit is provided at an upper portion, and the imaging unit is a wide-angle camera including a wide-angle lens.

Advantageous Effect of the Invention

According to the survey system of the aspects described above, a new method which makes possible to quickly lock on a target by a simple operation will be provided.

BRIEF DESCRIPTION OF DRAWINGS

FIG. 11 is an image view of a main process of the prisms lock-on function.

FIG. 20 is an image view of a main process of a prism lock-on function using the same surveying instrument.

DESCRIPTION OF EMBODIMENTS

Hereinafter, a detailed embodiment of the present disclosure will be described with reference to the drawings. The embodiment does not limit the present invention but is just an example, and all features and combinations thereof described in the embodiment are not always essential for the present invention. In the following description of the embodiment and modifications, the same configurations are provided with the same reference signs, and overlapping descriptions are omitted as appropriate.

1. Survey System

Figure 1:
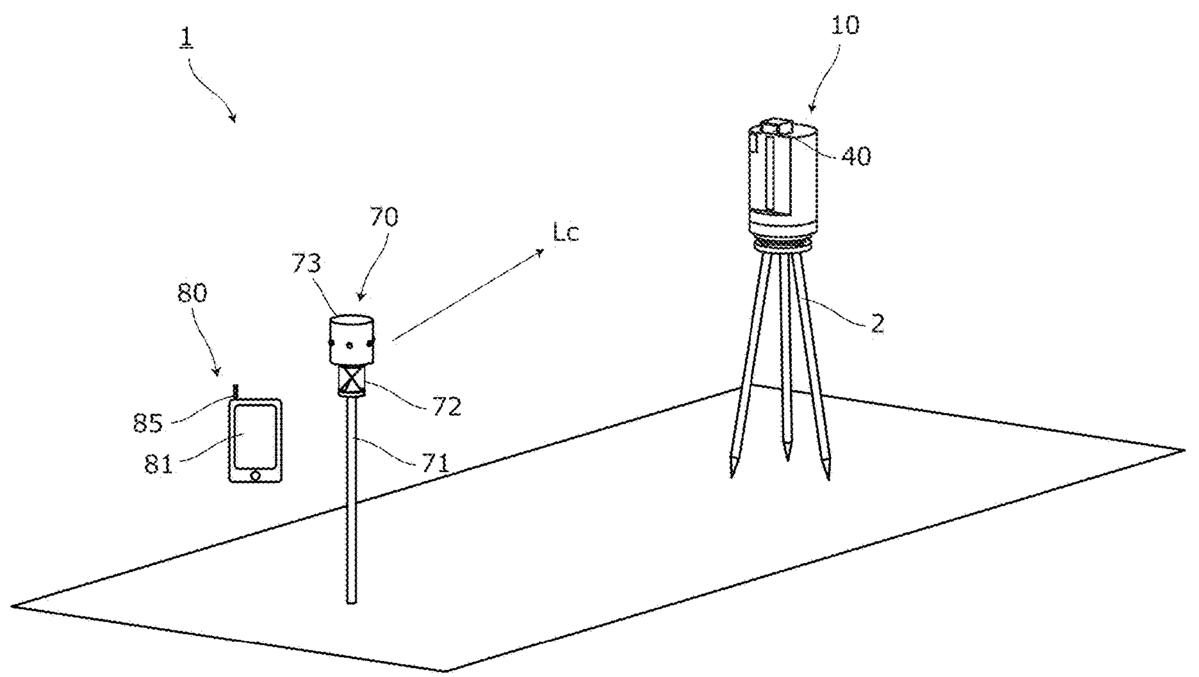
FIG. 1 is an outline configuration view of a survey system according to a preferred embodiment of the present invention.

FIG. 1 is a view illustrating an outline configuration of a survey system 1 according to a preferred embodiment of the present invention. The survey system 1 includes a surveying instrument 10, a target unit 70, and a controller 80. In the illustrated example, the surveying instrument 10 is a motor-driven total station having an automatic tracking function. The controller 80 is configured by implementing a controller function of the surveying instrument 10 in a smartphone. The surveying instrument 10 is installed at an arbitrary point, preferably, at P0. In this description, "surveying instrument is installed at a known point" includes not only installation at a known point but also a case where, after the surveying instrument is installed at an arbitrary point, coordinates thereof are known by a backward intersection method, etc.

The survey system 1 is suitable for a one-person-operated work. An operator vertically holds the target unit 70 with a prism 72, and carries the controller 80 with him/her by wearing it on his/her arm by a holder, etc., and measures each measurement point while moving.

The surveying instrument 10 includes an imaging unit 40. The target unit 70 includes an optical transmitter 73. The controller 80 includes a GNSS device 85. When starting remote tracking of a target or when tracking is lost, the target can be quickly locked on by performing the following operation.

Specifically, first, based on position information of the GNSS device 85, the surveying instrument 10 is horizontally rotated to direct a collimation axis toward the GNSS device 85. Here, an operator carrying the controller 80 including the GNSS device 85 with him/her holds the target unit 70, so that the direction of the GNSS device 85 is a general direction of the prism 72 (hereinafter, referred to as a "rough direction of the prism 72").

Next, tracking guide light Lc is emitted from the optical transmitter 73, and images when the tracking guide light Lc is on and off are imaged by the imaging unit 40, and from a difference between the images, an arrival direction of the tracking guide light Lc is calculated, and the surveying instrument 10 is rotated so as to direct the collimation axis toward the arrival direction of the tracking guide light Lc.

Positions of the optical transmitter 73 and the prism 72 in the horizontal direction coincide with each other, and the arrival direction of the tracking guide light Lc represents an accurate direction of the prism 72 (hereinafter, referred to as "accurate direction of the prism 72"). Then, by scanning the periphery by the tracking function, the prism 72 is captured and quickly locked on. In the present description, a function of performing this series of operations is referred to as a prism lock-on function.

Hereinafter, components of the survey system 1 and details of the prism lock-on function will be described.

2. Surveying Instrument 10

Figure 2:
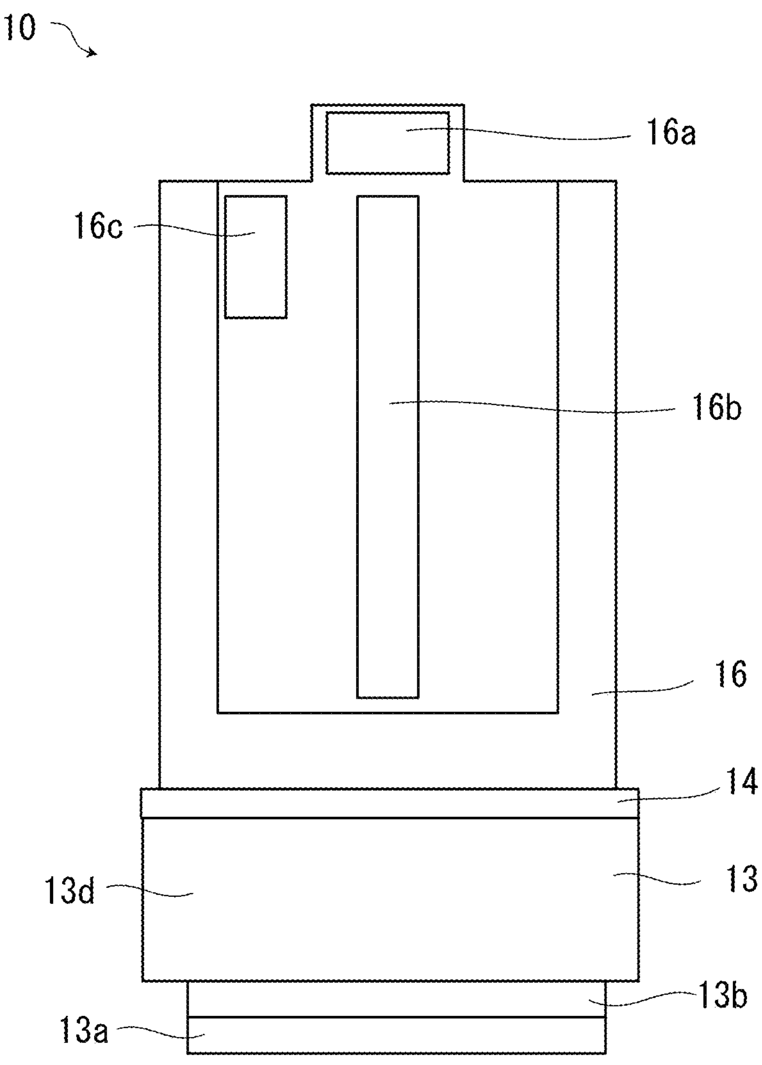
FIG. 2 is a front view of a surveying instrument constituting the survey system.
Figure 3:
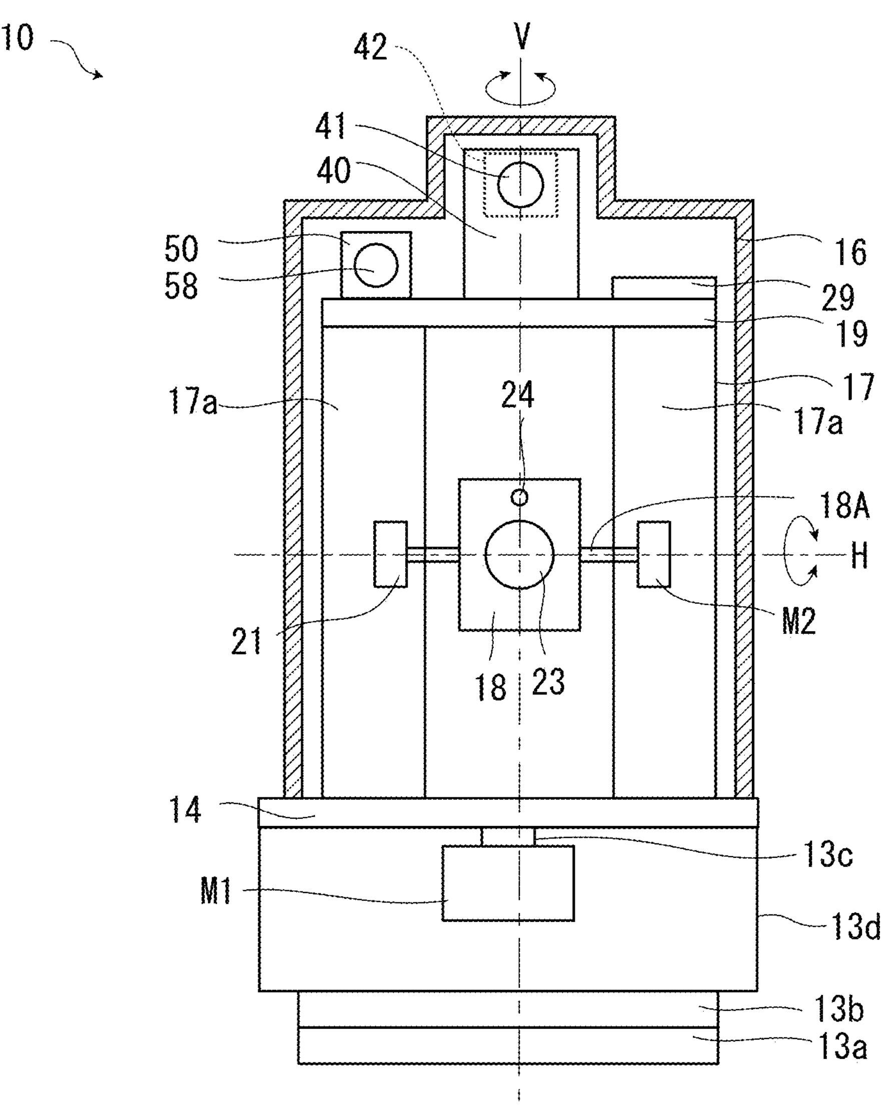
FIG. 3 is a schematic view schematically illustrating an internal structure of the surveying instrument.

The surveying instrument 10 will be described with reference to FIGS. 2 to 4. FIG. 2 is a front view of the surveying instrument 10. FIG. 3 is a schematic view schematically illustrating an internal structure of the surveying instrument 10. The surveying instrument 10 includes a base portion 13, a rotary base 14 to be rotated in the horizontal direction with respect to the base portion 13, and a cover member 16 that has a substantially cylindrical shape with an upper surface, and stores a surveying instrument main body 15 inside. The surveying instrument main body 15 includes a bracket portion 17, a telescope 18, the imaging unit 40, and a guide light irradiation unit 50.

The base portion 13 includes a fixed seat 13*a* to be fixed to a tripod 2, a leveling base 13*b* having a leveling screw (not illustrated), a rotary shaft 13*c* that horizontally rotates the rotary base 14 about an axis V, and a case 13*d* in which driving mechanisms such as a horizontal rotation driving unit M1 to drive and rotate the rotary shaft 13*c*, etc., are incorporated. The rotary shaft 13*c* is provided with a horizontal angle detector 21 not illustrated in FIG. 3.

On the rotary base 14, the bracket portion 17 consisting of a pair of support members 17*a* is erected. Between the pair of support members 17*a*, the telescope 18 is supported rotatably by the rotary shaft 18A. To one end portion of the rotary shaft 18A, a vertical rotation driving unit M2 that drives and rotates the telescope 18 in the vertical direction is fixed, and at the other end portion, a vertical angle detector 22 that detects a rotation angle of the telescope 18 is provided.

To an upper end portion of the bracket portion 17, a horizontal plate 19 disposed horizontally across the pair of support members 17*a* is fixed. Onto an upper surface of the horizontal plate 19, a surveying instrument control unit 29, the guide light irradiation unit 50, and the imaging unit 40 are attached. At an upper portion of the right support member 17*a*, the surveying instrument control unit 29 mounted on a control circuit board is disposed. The guide light irradiation unit 50 irradiates operator guide light to guide an operator. The guide light irradiation unit 50 is disposed on an upper portion of the left support member 17*a*. An optical axis of the guide light irradiation unit 50 and an optical axis of the telescope 18 are configured so as to become substantially parallel to each other in a plan view.

The cover member 16 has a projecting portion 16*a* projecting from an upper surface, and a front surface of the projecting portion 16*a* is flush with a front surface of the cover member 16. The imaging unit 40 is disposed at a center of a horizontal plate 19, and is housed in the projecting portion 16*a*.

In the front surface of the cover member 16, three windows in total are provided including an imaging window 16*d* provided in the front surface of the projecting portion 16*a*, a telescope window 16*b* extending in the up-down direction at the center, and a guide light window 16*c* at an upper corner of the front surface.

The telescope window 16*b* is formed on the optical axis (collimation axis) of the telescope 18, and transmits distance-measuring light and tracking light emitted by the distance-measuring unit 23 and the tracking unit 24. The guide light window 16*c* is formed on the optical axis of the guide light irradiation unit 50, and transmits the operator guide light. The imaging window 16*d* is formed in front of the imaging unit 40 and transmits visible light and tracking guide light Lc.

The telescope window 16*b* is slightly inclined in the horizontal direction. This is for preventing a problem in which emitted distance-measuring light or tracking light is reflected by a back surface of the telescope window 16*b* and enters the telescope and harmfully influences distance and angle measurements in a case where the telescope window 16*b* is orthogonal to the collimation axis.

At a connecting portion of the rotary base 14 to the cover member 16, a sealing member (not illustrated) that prevents infiltration of rainwater, etc., is provided.

Between the cover member 16 and the surveying instrument main body 15, a gap is provided. Accordingly, the cover member 16 can be prevented from coming into contact with the surveying instrument main body 15 at the time of attachment and detachment of the cover member 16. Even after the cover member 16 is detached, it is not necessary to adjust the optical axes of the telescope 18, the imaging unit 40, and the guide light irradiation unit 50.

Figures 4, 5:
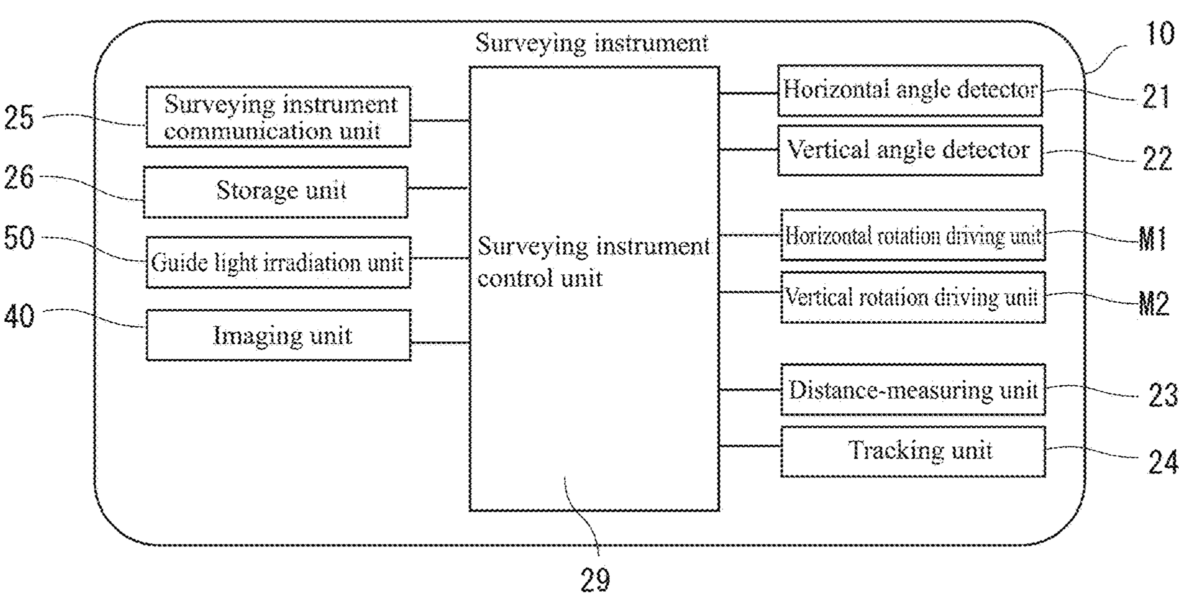
FIG. 4 is a block diagram of the surveying instrument.
FIG. 5 is a schematic diagram schematically illustrating a configuration of an imaging unit included in the surveying instrument.

FIG. 4 is a block diagram of the surveying instrument 10. As illustrated in FIG. 4, in the surveying instrument 10, the horizontal angle detector 21, the vertical angle detector 22, the horizontal rotation driving unit M1, the vertical rotation driving unit M2, the distance-measuring unit 23, the tracking unit 24, the surveying instrument communication unit 25, the storage unit 26, the guide light irradiation unit 50, and the imaging unit 40 are respectively connected to the surveying instrument control unit 29.

The horizontal angle detector 21 and the vertical angle detector 22 are absolute encoders or incremental encoders. The horizontal angle detector 21 detects a horizontal angle of the rotary base 14, that is, a horizontal angle of the telescope 18. The vertical angle detector 22 detects a vertical angle of the telescope 18.

The horizontal rotation driving unit M1 and the vertical rotation driving unit M2 are motors. Under control of the surveying instrument control unit 29, the horizontal rotation driving unit M1 drives the rotary shaft 13*c*, and the vertical rotation driving unit M2 drives the rotary shaft 18A. According to cooperation of both driving units, the telescope 18 is rotated in the horizontal direction and the vertical direction.

The distance-measuring unit 23 includes a light transmitting unit including a light emitting element such as a laser diode, a distance-measuring optical system, and a light receiving unit including a light receiving element such as an avalanche photodiode (not illustrated). The distance-measuring unit 23 emits distance-measuring light that is, for example, infrared laser light or the like to the prism 72 through the distance-measuring optical system and receives reflected light of the distance-measuring light by the light receiving unit to measure a distance to a center of the prism 72 from a phase difference or a temporal difference between the distance-measuring light and internal reference light.

The tracking unit 24 includes a tracking light transmitting unit including a light emitting element such as a laser diode, a tracking optical system, and a tracking light receiving unit including an image pickup device such as a CCD (Charge-Coupled Device) or a CMOS (Complementary Metal-Oxide Semiconductor) (not illustrated). The tracking unit 24 emits, as tracking light, infrared laser light of a wavelength different from that of the distance-measuring light, acquires landscape images in a collimation direction when the tracking light is on and off, and outputs both images to the surveying instrument control unit 29. The surveying instrument control unit 29 obtains a center of a figure of the prism 72 as a target from a difference between the images, and calculates a position of the target. The surveying instrument control unit 29 always directs the telescope 18 toward the target by driving the horizontal rotation driving unit M1 and the vertical rotation driving unit M2 so that a deviation of the center of the target from the collimation axis center of the telescope 18 falls within a certain value.

The surveying instrument communication unit 25 is a communication interface that enables information transmission to and reception from the target unit 70 and the controller 80. As a communication means, Wi-Fi, Bluetooth (registered trademark), infrared communication, and a cellphone network, etc., can be used. The communication means is not limited to these, and known wire and wireless communication standards may be used. The surveying instrument 10 transmits a measurement result and the images acquired with the imaging unit 40 to the controller 80 through the surveying instrument communication unit 25. Various commands input from the controller 80 are input into the surveying instrument control unit 29 through the surveying instrument communication unit 25. In addition, various information for executing the prism lock-on function can be transmitted and received between the surveying instrument 10, and the target unit 70 and controller 80 through the surveying instrument communication unit 25.

The storage unit 26 is a computer-readable storage medium, for example, an HDD (Hard Disc Drive), a flash memory, or the like. Programs for executing various functions of the surveying instrument control unit 29 including the prism lock-on function are stored. The storage unit 26 stores various data such as measurement data acquired by the surveying instrument 10.

The surveying instrument control unit 29 is a control arithmetic unit including at least one processor (for example, CPU (Central Processing Unit)) and at least one memory (for example, SRAM (Static Random Access Memory), DRAM (Dynamic Random Access Memory), etc.). The surveying instrument control unit 29 executes a function of the surveying instrument 10 by reading a program for executing the function into the memory and executing the program.

The surveying instrument control unit 29 controls the horizontal angle detector 21, the vertical angle detector 22, the horizontal rotation driving unit M1, the vertical rotation driving unit M2, the distance-measuring unit 23, the tracking unit 24, the surveying instrument communication unit 25, the storage unit 26, and the guide light irradiation unit 50. Specifically, the surveying instrument control unit 29 performs controls necessary for the respective components to execute the distance and angle measuring function and the automatic tracking function.

When tracking is lost, the surveying instrument control unit 29 transmits a signal that notifies of this (hereinafter, the signal is referred to as a lost signal) to the controller 80 and the target unit 70. The surveying instrument control unit 29 calculates a difference between the collimation direction and an azimuth of the GNSS device 85 at a current position from the surveying instrument 10, detected from position information of the GNSS device 85 acquired at the current position, and rotates the telescope 18 in the horizontal direction to direct it toward the GNSS device 85. In addition, the surveying instrument control unit 29 causes the imaging unit 40 to acquire images when light of the optical transmitter 73 is off and on Timing control with respect to the optical transmitter 73 when acquiring the images will be described later. A direction of the optical transmitter 73 is calculated from a difference image between the images, and the telescope 18 is rotated in the horizontal direction and directed toward the optical transmitter 73. Then, the surveying instrument control unit 29 performs scanning in the vertical direction by the tracking unit 24 and locks on the prism 72.

At least a part of functions of the surveying instrument control unit 29 may be configured hardware-wise by a CPLD (Complex Programmable Logic Device), an FPGA (Field Programmable Gate Array), etc. In a case where a CPLD or an FPGA is used, its function is realized by a circuit, etc., configured on a device. That is, the surveying instrument control unit 29 may include a processor that realizes functions software-wise, and a processing circuit including a circuit that realizes functions hardware-wise.

The guide light irradiation unit 50 includes a pair of light emitting diodes, and a guide light optical system including a pair of diaphragms, a right-angle mirror, and a collimating lens, etc., not illustrated. One of the pair of light emitting diodes is a red light emitting diode, and the other is a green light emitting diode. In the present embodiment, the guide light irradiation unit 50 is configured to irradiate operator guide light extending in a fan shape in the horizontal direction and including red light on the right side of the collimation axis of the surveying instrument 10 and green light on the left side.

The imaging unit 40 is a so-called digital camera including an image pickup device 41 such as a CCD or CMOS, a lens 42, a filter 43, and a filter switching device 44. The imaging unit 40 can acquire an image in front of the surveying instrument 10 in the form of a moving image or a still image in real time. An optical axis of the imaging unit 40 is disposed so as to become parallel to the collimation axis of the surveying instrument 10 in the horizontal direction. The image pickup device 41 has an orthogonal coordinate system with an origin set at an imaging center, and local coordinates of each pixel can be identified.

The lens 42 is a wide-angle lens with a viewing angle of 60° to 100°, and can acquire at least an image of a wider field of view than that of the telescope 18. The filter 43 includes a first filter 43*a* and a second filter 43*b*. The first filter 43*a* transmits light in a visible light range, and blocks other light. The second filter 43*b* transmits only light of wavelengths in the vicinity of a range centered on and around a wavelength of the tracking guide light Lc that the optical transmitter 73 described later transmits. And, the second filter 43*b* blocks light of other wavelengths. The first filter 43*a* and the second filter 43*b* can be switched by being put onto and taken out of the optical path by the filter switching device 44.

Figure 6A:
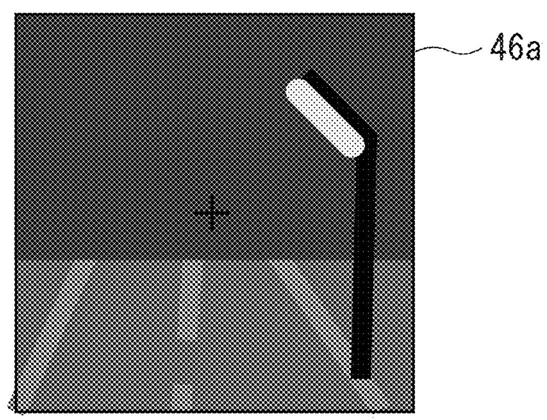
FIGS. 6A to 6C are views describing images for calculation of a direction of tracking guide light.
Figure 6B:
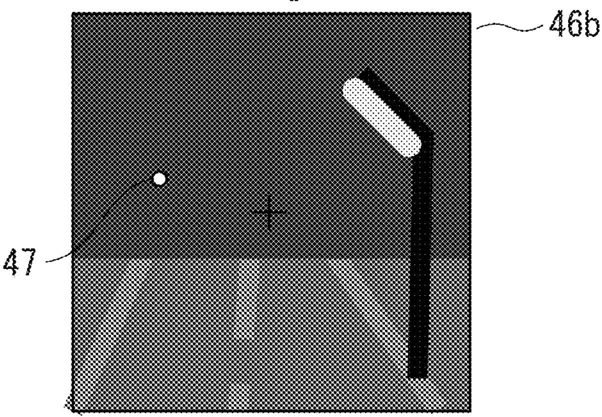
Figure 6C:
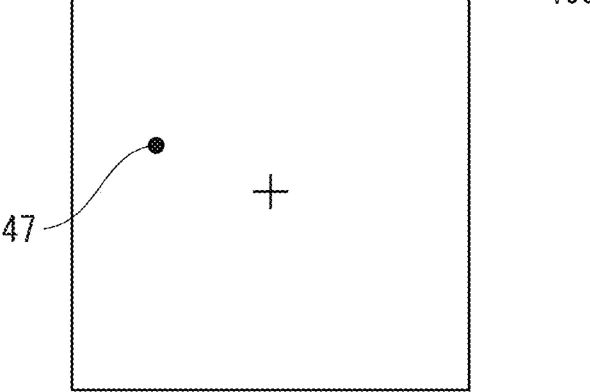

During execution of the prism lock-on function, the second filter 43*b* is disposed in the optical path. FIGS. 6A and 6B are views describing an image 46*a* imaged by the imaging unit 40 when the optical transmitter 73 lights on and an image 46*b* when the optical transmitter 73 lights off, and FIG. 6C is a view describing a difference image 46*c* between the images. As illustrated in FIGS. 6A and 6B, due to the operation of the second filter 43*b*, imaging is performed so that a FIG. 47 of the tracking guide light Lc is recognized. By performing an image analysis of the difference image 46*c* by the surveying instrument control unit 29 by using a publicly known method, a direction of a center of the FIG. 47 of the tracking guide light is calculated, that is, an arrival direction of the tracking guide light Lc (accurate direction of the prism 72) can be calculated.

On the other hand, during tracking and normal use, the first filter 43 is disposed on the optical path. Accordingly, a landscape in front of the surveying instrument 10 is imaged. The landscape imaged by the imaging unit 40 is transmitted to the controller 80 through the surveying instrument communication unit 25, and displayed on the display unit 82.

When the surveying instrument control unit 29 detects that the prism 72 has been lost from tracking, switching to the second filter 43*b* is made by the filter switching device 44, and when the surveying instrument control unit senses lock-on of the prism 72, switching to the first filter 43*a* is made.

3. Target Unit

Figure 7A:
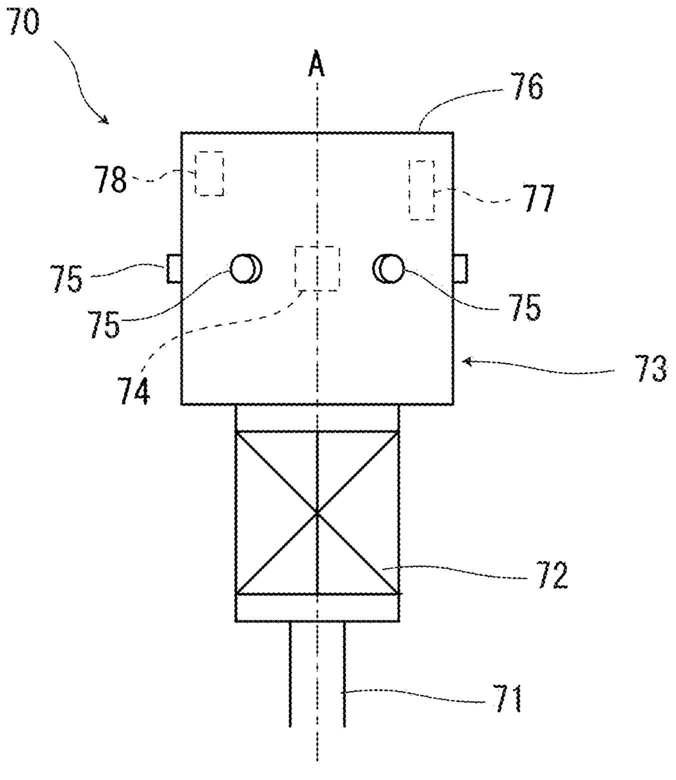
FIG. 7A is a side view of a target unit constituting the system described above.
Figure 7B:
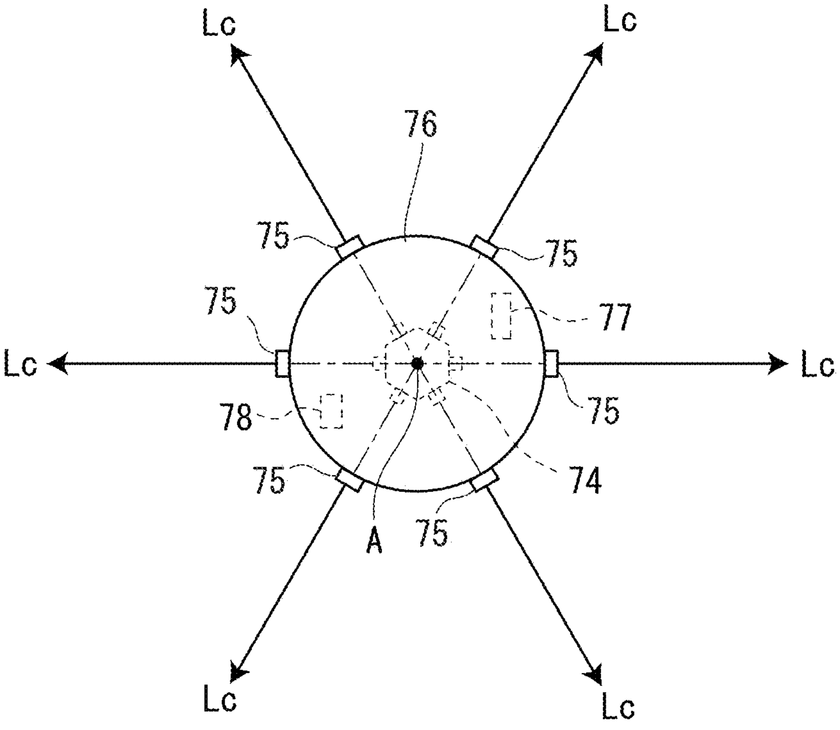
FIG. 7B is a plan view of the target unit.

FIG. 7A is a side view of the target unit 70, and FIG. 7B is a plan view of the same. Refer to the target unit 70 in FIG. 1 as well.

The target unit 70 includes a pole 71 as a target support member, the prism 72, and the optical transmitter 73. The prism 72 is supported on an upper end of the pole 71 so that the central axis A of the pole 71 passes through the optical center of the prism 72. A distance between the optical center of the prism 72 and a lower end of the pole 71 (attaching height) is known. During movement of the operator, the target unit 70 is carried while the central axis A of the pole 71 is maintained in a vertical state, and at a measurement point, while the central axis A of the pole 71 is held in the vertical state, the lower end of the pole 71 is brought into contact with the measurement point, and a distance and angles of the prism 72 are measured by the surveying instrument 10.

The optical transmitter 73 includes a columnar-shaped housing 76, a light source 74, an optical transmitter control unit 77, and an optical transmitter communication unit 78. The optical transmitter 73 is attached to an upper end of the prism 72 so that a central axis of the housing 76 coincides with the central axis A of the pole 71.

The light source 74 is, for example, an infrared LED (Light Emitting Diode), and emits, as tracking guide light Lc, infrared light of a wavelength different from wavelengths of the distance-measuring light and the tracking light. The light source 74 is attached in the vicinity of a center of the inside of the housing 76 so as to emit tracking guide light Lc all around the central axis A of the pole 71. In an outer circumferential surface of the housing 76, a plurality of light transmission ports 75 are disposed at even intervals in the circumferential direction on a plane orthogonal to the central axis A of the pole 71. The number of light transmission ports 75 is 6 in the illustrated example, but is not limited to this. As illustrated in FIG. 7B, it is preferable that the tracking guide light Lc is emitted radially in all circumferential directions around the central axis A as illustrated in FIG. 7B. This is because the operator does not have to consciously direct the light transmission ports 75 toward the surveying instrument 10, and the operation becomes easy. However, without limitation to this, the light transmitting direction may be some or one direction of all circumferential directions. In this case, the operator only has to rotate the pole 71 to direct the light emitting direction toward the surveying instrument 10. The location of the optical transmitter 73 is not limited to the upper end side of the prism 72, but may be the lower end side thereof.

The optical transmitter control unit 77 is a microcontroller configured by mounting, for example, a CPU and a memory on a board, and controls activation and stoppage of the light source 74 according to a command from the controller 80 or a signal from the surveying instrument 10. The optical transmitter control unit 77 causes the light source 74 to repeat flashing at predetermined intervals.

The optical transmitter communication unit 78 is a communication interface equivalent to the controller communication unit 84, and enables communication with the surveying instrument 10 and the controller 80. Through the optical transmitter communication unit 78, a driving command from the controller 80 and a signal from the surveying instrument 10 are input to the optical transmitter 73.

In the present embodiment, the optical transmitter 73 is configured to control activation and stoppage of the light source 74 according to a signal from the surveying instrument 10 or a command from the controller 80. This is advantageous from the viewpoint of power saving. However, this is not essential, and the optical transmitter 73 may be configured to always flash at predetermined intervals during measurement. In this case, the optical transmitter communication unit 78 is not necessary, and the optical transmitter only has to be configured to allow its power supply to be manually turned ON and OFF.

4. Controller 80

Figure 8:
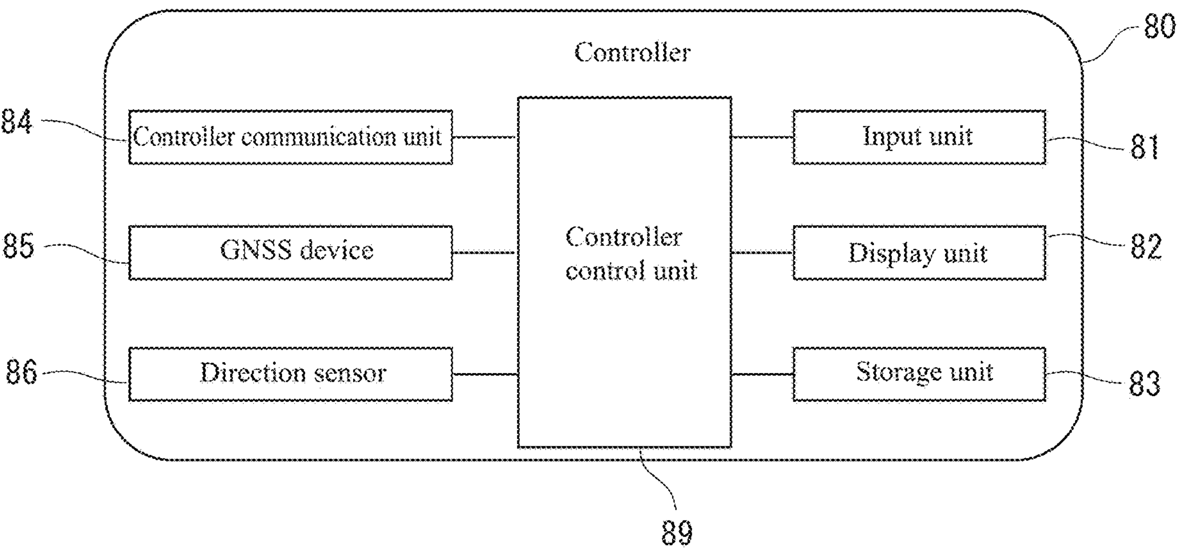
FIG. 8 is a block diagram of a controller constituting the system described above.

FIG. 8 is a block diagram of the controller 80. The controller 80 is an operation terminal that remotely operates the surveying instrument 10. The controller 80 includes an input unit 81, a display unit 82, a storage unit 83, a controller communication unit 84, a GNSS device 85, a direction sensor 86, and a controller control unit 86.

The input unit 81 and the display unit 82 are user interfaces of the controller 80. An operator can input an operation instruction and information of the surveying instrument 10 from the input unit 81. The display unit 82 is a touch panel type liquid crystal display, and is integrated with the input unit 81.

The controller communication unit 84 has a configuration equivalent to that of the surveying instrument communication unit 25, and can transmit and receive information to and from the surveying instrument 10 and the optical transmitter 73.

The GNSS (Global Navigation Satellite System) device 85 is a device to receive a navigation signal transmitted from a navigation satellite, and acquires current position information (latitude and longitude) of the device itself from the received navigation signal. As the GNSS device 85, a GPS (Global Positioning System) device is used. Without limitation to this, a satellite positioning system such as a QZSS (Quasi-Zenith Satellite System), GLONASS (GLObal'naya NAvigatsionnaya Sputnikovaya Sistema), or Galileo, may be used. The GNSS device 85 may be a differential positioning device, however, a single positioning device is sufficient. The GNSS device 85 is used to obtain a rough direction of the prism 72, and is not required to detect an accurate relative direction by acquiring highly accurate three-dimensional information.

The direction sensor 86 is an electronic compass using a semiconductor. The direction sensor 86 calculates a direction by detecting earth's south-north magnetism. A publicly known electronic compass using an MR device (Magneto Resistive Sensor) or using a GMR device (Giant Magneto Resistive Sensor), etc., can be used, and its type is not limited.

The storage unit 83 is a computer-readable storage medium, for example, a flash memory, an HDD, or the like. The storage unit 83 stores measurement data input from the surveying instrument 10 and design data of a survey site.

The controller control unit 89 is a control arithmetic unit including at least one processor (for example, CPU) and at least one memory (for example, SRAM, DRAM, etc.).

Based on position information of the GNSS device 85 acquired at a surveying instrument installation point and position information of the GNSS device 85 acquired at an arbitrary point away from the surveying instrument 10, the controller control unit 89 detects, as a rough direction of the prism 72, an azimuth of the GNSS device 85 at the arbitrary point with respect to the surveying instrument 10 by the GNSS device 85. In addition, from position information of the GNSS device 85 at a current position, the controller control unit 89 calculates an azimuth of the GNSS device 85 with respect to the surveying instrument 10 and transmits the azimuth to the surveying instrument 10. The controller control unit 89 commands the optical transmitter 73 to activate and stop the light source 74.

Also, based on the position information of the GNSS device 85, the direction signal of the direction sensor 86, and the design data, the controller control unit 89 creates a map for a survey work, and displays the map on the display unit 82, and executes various functions for assisting the survey work. In addition, the controller control unit 89 displays an image imaged by the imaging unit 40 and received from the surveying instrument 10 on the display unit 82.

In the example described above, the controller 80 is configured by a smartphone, however, without limitation to this, the controller 80 can be realized by a mobile computer terminal having a communication function such as a mobile phone, a tablet, a PDA (Personal Digital Assistance), or a data collector. However, since a general smartphone includes all of the mechanical configurations of the controller 80, the use of a smartphone is advantageous in terms of cost.

The controller control unit 89 and the surveying instrument control unit 29 cooperate to function as a control unit of the survey system 1. The system control unit in claims consists of the controller control unit 89 and the surveying instrument control unit 29.

5. Prism Lock-on Function

Figure 11:
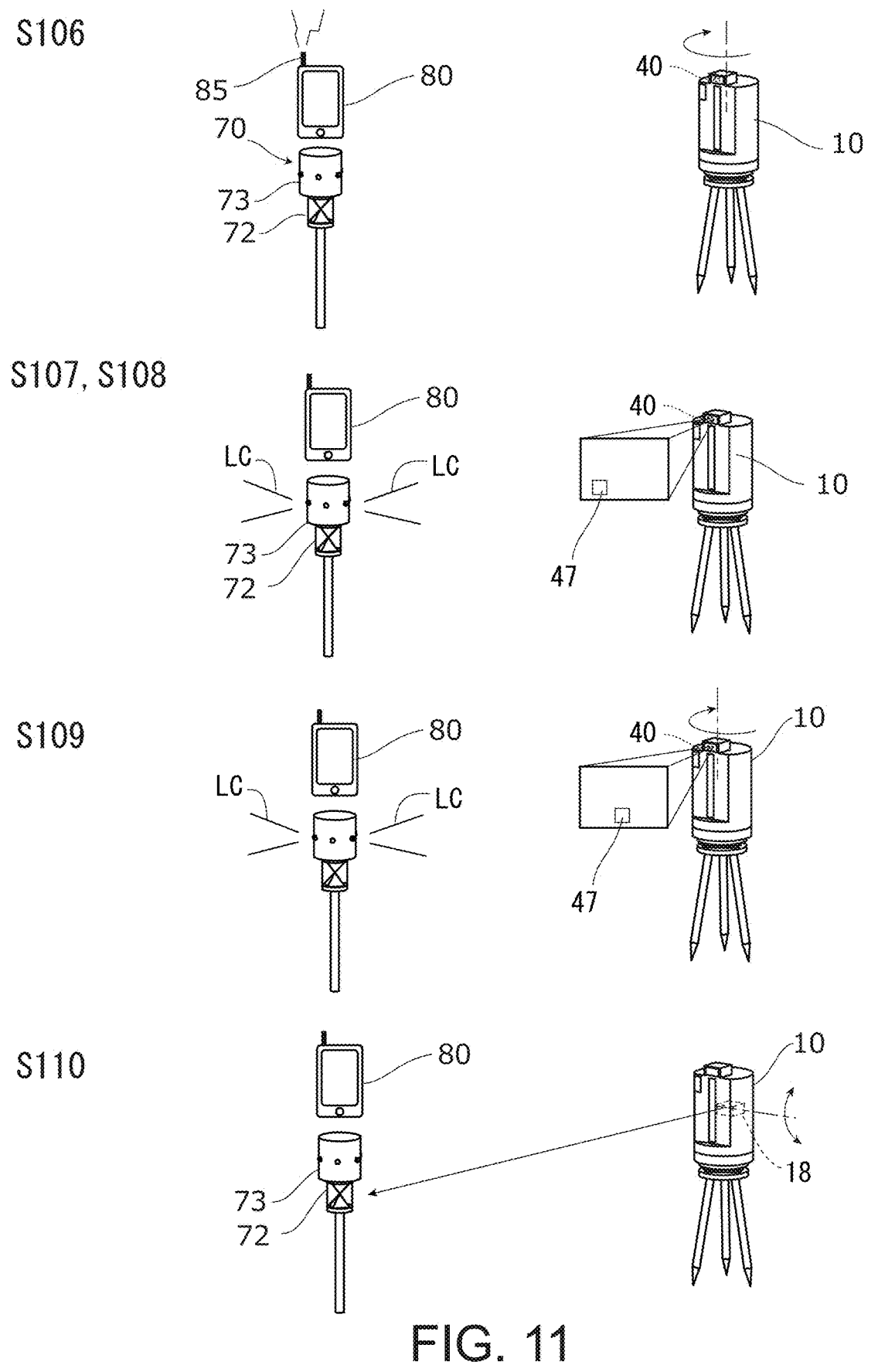

Hereinafter, the prism lock-on function in the survey system 1 will be described with reference to FIGS. 9 to 11.

Figure 9:
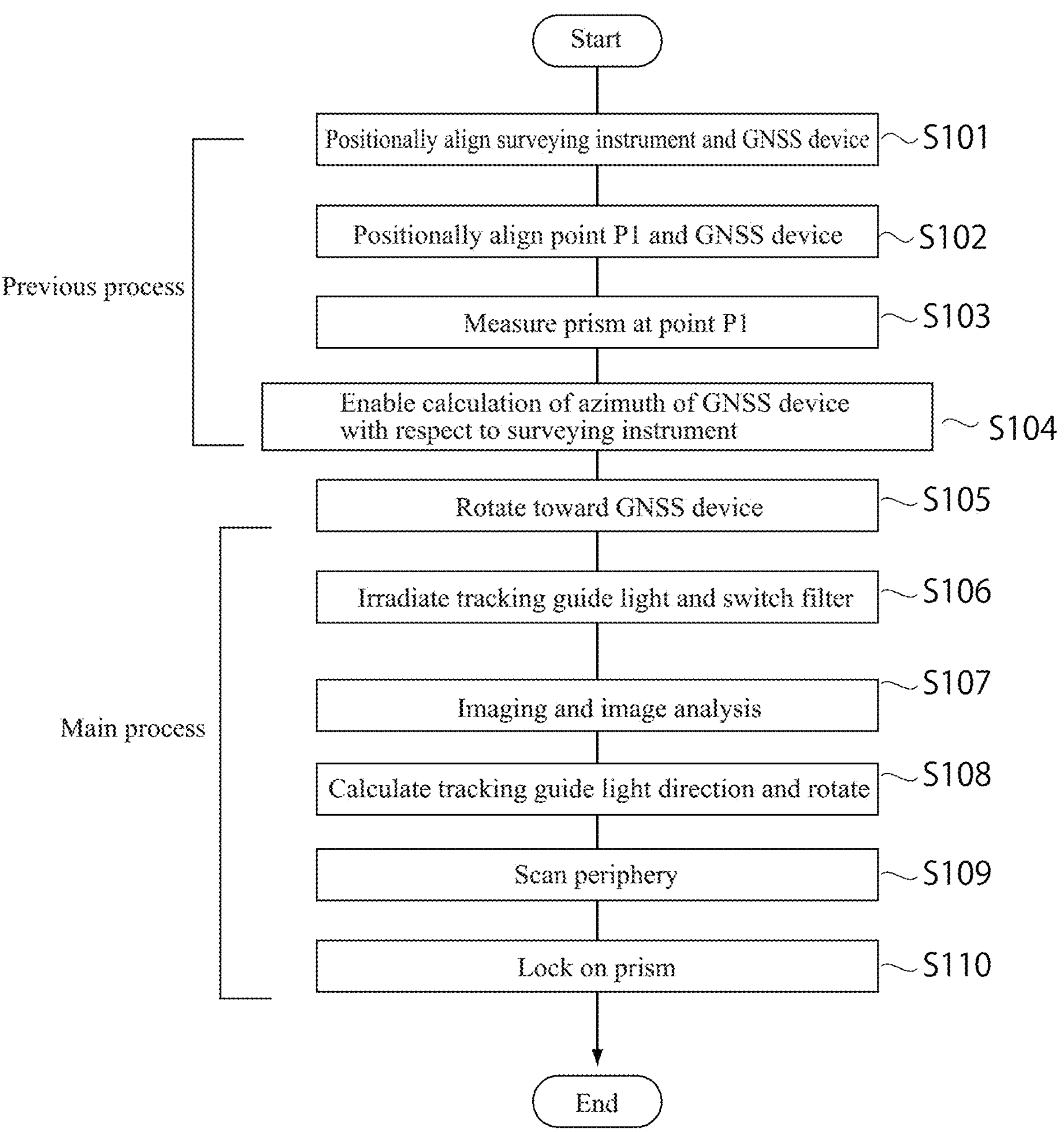
FIG. 9 illustrates an example of a flow of processing of a prism lock-on function.
Figure 10:
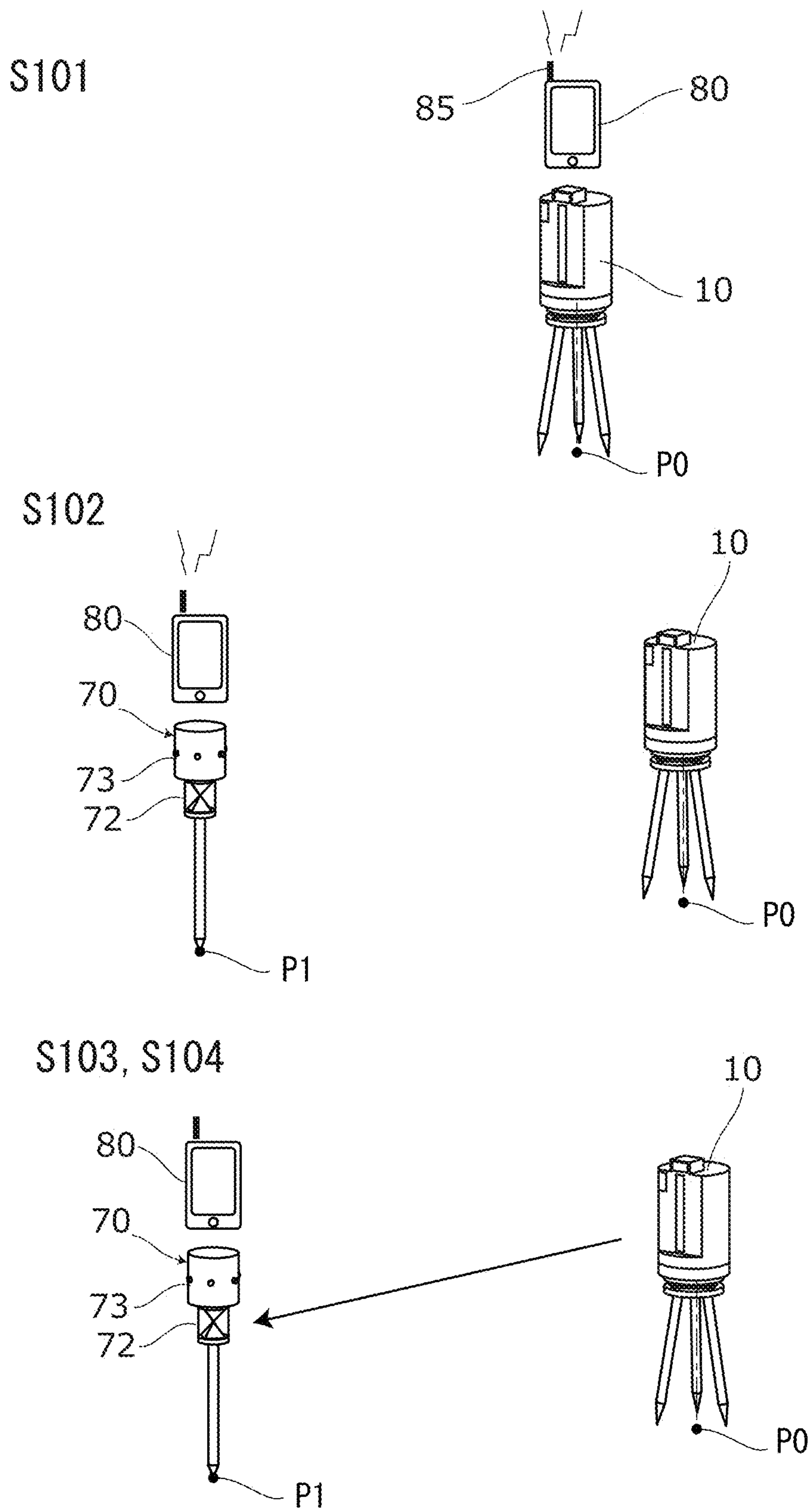
FIG. 10 is an image view of a previous process of the prism lock-on function.

FIG. 9 is a flowchart of the prism lock-on function. FIG. 10 is an image view of Steps S101 to S104. FIG. 11 is an image view of Steps S105 to S109.

First, in Step S101, as a previous process, the surveying instrument 10 is installed at a known point P0, and the GNSS device 85 of the controller 80 is positionally aligned with the surveying instrument 10. Specifically, the controller 80 is positioned proximal to the surveying instrument 10, and position information (latitude and longitude) of the surveying instrument 10 at the installation point is acquired by the GNSS device 85. In order to improve the accuracy of this positional alignment, for example, on an axis V coincident with an instrument center on an upper surface of the surveying instrument 10, a guide indication or a guide groove for positioning the controller 80 may be provided. Position information of the controller 80 is stored as a position of the surveying instrument 10 in the storage unit 83.

Next, in Step S102, the operator holding the controller 80 and the target unit 70 and in a state where the surveying instrument 10 is caused to track the target unit 70, moves to an arbitrary point P1 relatively distant from the surveying instrument 10, and acquires position information (latitude and longitude) at the point P1 by the GNSS device 85 and performs positional alignment.

Next, in Step S103, the surveying instrument 10 is caused to measure a distance and angles of the prism 72. (At least angles are measured.) As with the surveying instrument 10, a guide indication or a guide groove for positional alignment of the controller 80 may also be provided on a central axis A on an upper surface of the optical transmitter 73 of the target unit 70.

Then, in Step S104, the controller control unit 89 calculates an azimuth of the controller 80 with respect to the surveying instrument 10 from the position information at the point P0 and the position information at the point P1, and stores the azimuth in the storage unit 83. The surveying instrument control unit 29 calculates an azimuth from the point P0 to the point P1 by the surveying instrument 10 from the measurement result of the prism 72 at the point P1, and acquires a collimation direction of the surveying instrument. Accordingly, references of the azimuth of the controller 80 and the collimation direction of the surveying instrument 10 are matched with each other. Then, when moving to an arbitrary point P2, based on position information at the point P2 acquired by the GNSS device 85, a relative angle (azimuth) of the GNSS device 85 with respect to the surveying instrument 10 can be calculated.

Further, a configuration may be made in which the prism 72 of the target unit 70 held by the operator is tracked, and while the operator moves, distance and angle measurements are made as needed, and accordingly, the direction of the controller 80 with respect to the surveying instrument 10 is sequentially calibrated.

The operator moves with the target unit 70 and the controller 80. Acquisition of a navigation signal by the GNSS device 85 is performed as needed during the movement, so that even after or while the operator moves, a rough direction of the prism 72 is grasped.

Next, as a main process, in Steps S105 to S110, a work for starting tracking by the tracking unit 24 or restarting tracking when tracking is lost, will be described.

The main process is manually started according to a command of the operator through the controller 80 or automatically starts when the target unit 70 and the controller 80 receive a lost signal transmitted by the surveying instrument 10. In the case of automatic starting, the operator may be notified that the main process will be entered since tracking has been lost by making a display notifying of this on the display unit 82 of the controller 80.

When the main process starts, in Step S105, based on the current position information acquired by the GNSS device 85 and received from the controller 80, the surveying instrument control unit 29 calculates an azimuth between the surveying instrument 10 and the GNSS device 85, and based on a difference between a horizontal direction angle of the collimation direction of the surveying instrument 10 and the azimuth, the horizontal rotation driving unit M1 is driven to rotate the telescope 18 in the horizontal direction, and directs the collimation axis of the telescope 18 toward the GNSS device (rough direction of the prism 72). When the horizontal rotation driving unit M1 stops, the surveying instrument control unit 29 transmits a signal for notifying of the completion of the rotation to the controller 80 and the optical transmitter 73.

Upon reception of the signal for notifying of the completion of the rotation, in Step S106, the controller control unit 89 causes the optical transmitter 73 to drive the light source 74. In addition, the surveying instrument control unit 29 drives the filter switching device 44 to perform switching so that the second filter 43*b* is disposed on the optical path of the imaging unit 40.

Next, in Step S107, images when the tracking guide light Lc is on and off are taken, and by performing an image analysis of a difference image between the images, a position of the tracking guide light Lc is detected. Specifically, under control of the surveying instrument control unit 29, the imaging unit 40 takes images in front of the surveying instrument 10 when the optical transmitter 73 is on light and is off light. The surveying instrument control unit 29 detects a figure of the tracking guide light Lc by analyzing a difference image between the images. As imaging ends, the surveying instrument control unit 29 transmits a signal for notifying of the end of imaging to the optical transmitter 73.

Next, in Step S108, the surveying instrument control unit 29 calculates an arrival direction of the tracking guide light Lc based on a result of the image analysis, and drives the horizontal rotation driving unit M1 to rotate the telescope 18 so as to direct the collimation axis of the telescope 18 toward the arrival direction of the tracking guide light Lc (accurate direction of the prism 72).

Next, in Step S109, the surveying instrument control unit 29 drives the telescope 18 in the up-down direction by the vertical rotation driving unit M2 and scan the periphery of the collimation direction vertically by tracking light of the tracking unit 24, and detects the prism 72. When calculating the arrival direction of the tracking guide light Lc in Step S108, the surveying instrument control unit 29 also grasps an angle of the arrival direction of the tracking guide light Lc in the z direction. A positional relationship between the prism 72 and the optical transmitter 73 is known, and by preferentially scanning this range, the prism 72 can be more quickly detected.

Next, in Step S110, the surveying instrument control unit 29 locks on the prism 72. At the same time, the surveying instrument control unit 29 causes the filter switching device 44 to switch from the second filter 43*b* to the first filter. In addition, a signal for notifying of the completion of prism lock-on is transmitted to the optical transmitter 73. In response to this, the optical transmitter 73 stops activation of the light source 74. Then, the flow ends, and the processing shifts to a tracking operation by the tracking unit 24.

The controller 80 and the surveying instrument 10 can transmit and receive information to and from each other. Therefore, regardless of whether processing of the controller control unit 89 and processing of the surveying instrument control unit 29 in the flow of the main processing are performed by either the controller control unit 89 or the surveying instrument control unit 29, the same functions are realized.

According to the survey system 1, first, the surveying instrument 10 is directed toward a rough direction of the prism 72 based on position information of the GNSS device 85, and then, tracking guide light Lc is detected by the imaging unit 40 so that the surveying instrument 10 is directed toward an arrival direction of the tracking guide light Lc, that is, an accurate direction of the prism 72. Then, by performing scanning in the up-down direction by tracking light of the tracking unit 24, the prism 72 is searched for and locked on.

In this way, by directing the telescope 18 toward the rough direction and then the accurate direction of the prism 72 in order, haphazard scanning in all directions is made unnecessary. Rotations toward the rough direction and the accurate direction are not performed while scanning, so that it is also possible to increase the rotation speed. When performing scanning in the vertical direction by the tracking unit 24 in Step S109, an angle in the vertical direction is also generally grasped from the result of the image analysis in Step S107. Therefore, the surveying instrument control unit 29 can shorten the time of vertical scanning by preferentially scanning the periphery of the position in the vertical direction obtained from the result of the image analysis.

The configuration is made so that, when target tracking is lost, by a signal from the surveying instrument 10, rotation toward the rough direction is automatically performed, and then, activation of the optical transmitter 73 and imaging by the imaging unit 40 are automatically started, so that the operator does not have to interrupt the work to perform a work such as a work to direct the optical transmitter toward the surveying instrument and operate it as in the conventional case, so that the work efficiency is improved.

When a configuration is made so that tracking guide light Lc to be emitted from the target unit 70 is emitted all around the central axis of the target support member of the target unit 70 in a direction orthogonal to the central axis, the operator does not have to positionally align the direction of the optical transmitter 73 with the surveying instrument 10, and this saves the operator's labor.

In the present embodiment, when performing scanning in the vertical direction by the tracking unit 24 in Step S110 described above, an angle in the vertical direction is also generally grasped from the result of the image analysis in Step S107. Therefore, the surveying instrument control unit 29 can shorten the time of vertical scanning by preferentially scanning the periphery of the position in the vertical direction obtained from the result of the image analysis.

Figure 16:
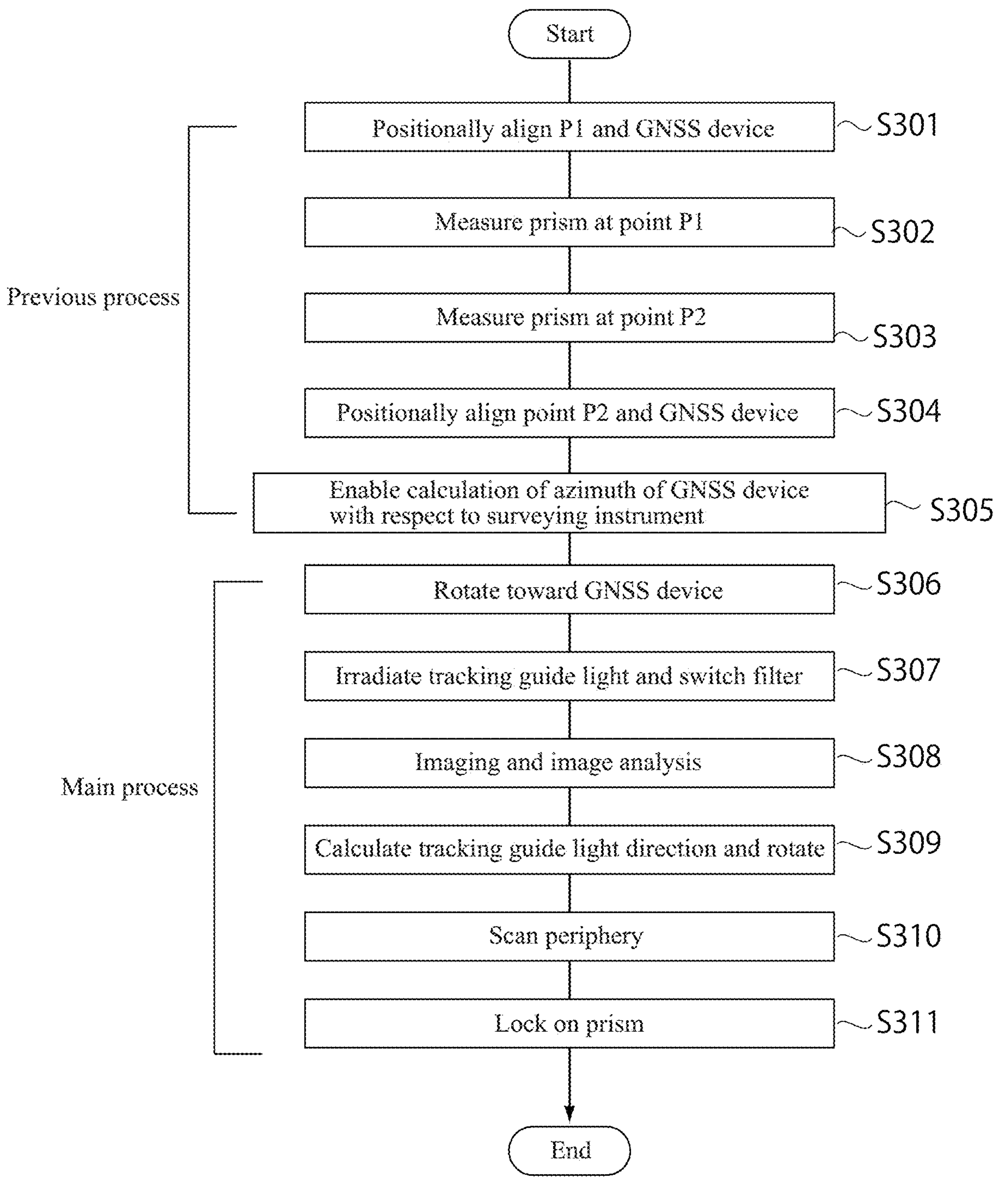
FIG. 16 illustrates an example of a flow of processing of a prism lock-on function of a survey system according to another modification.

The surveying instrument 10 illustrated in the embodiment is configured so that the telescope 18 is supported on the rotary base 14, the bracket portion 17 without a casing is erected and covered from above by a substantially cylindrical cover member 16 having an upper surface, and the surveying instrument 10 is collimated from the telescope window 16*b* provided in the front surface of the cover member 16. This configuration is advantageous in terms of cost because it makes the surveying instrument 10 compact and reduces the number of components, however, the field of view of the telescope 18 is narrow as compared with, for example, a surveying instrument 1B of a type that does not include the cover member 16 but includes casings respectively for the telescope 18B and the bracket portion 17B as illustrated in FIG. 16 described later. Therefore, searching by the tracking unit using a conventional technique when tracking is lost is difficult. The prism lock-on function that enables searching in a wider range by using a wide-angle camera described above and the configuration for this function are particularly advantageous when a surveying instrument including the cover member 16 like the surveying instrument 10 is used.

6. Imaging Control

Figure 12:
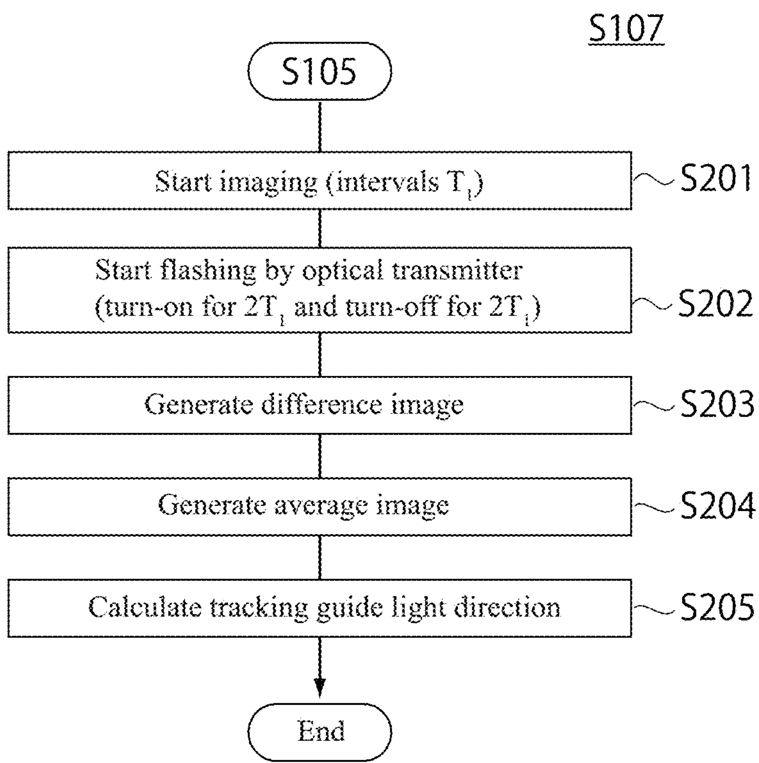
FIG. 12 illustrates a flow of imaging and direction detection process in the prism lock-on function described above.
Figure 13:
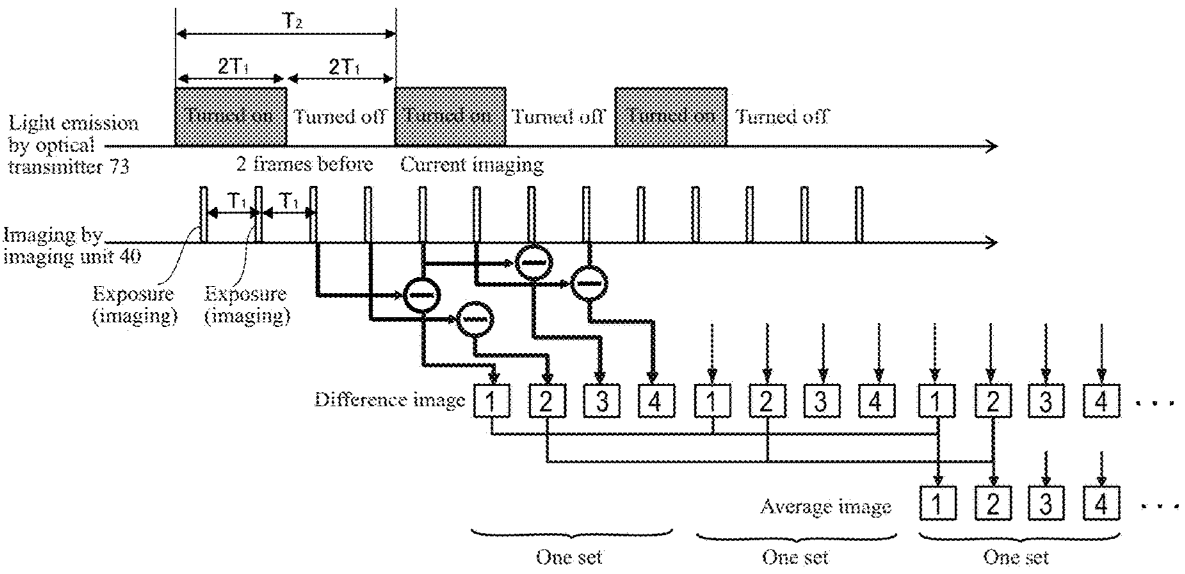
FIG. 13 is a chart describing a control of imaging and light emission of an optical transmitter in the imaging process.
Figure 14:
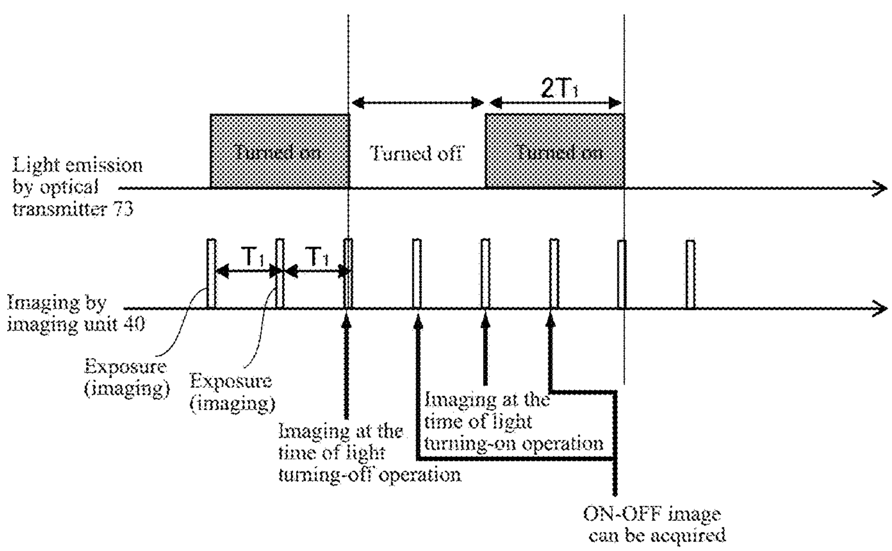
FIG. 14 is a chart describing a control of imaging and light emission of the optical transmitter in the imaging process.

In the present embodiment, in imaging in S107, at the time of imaging of images by the imaging unit 40 when the optical transmitter 73 is on and is off, imaging by the imaging unit 40 and a light turning-on timing of the optical transmitter 73 are asynchronously controlled. With reference to FIGS. 12 to 14, this asynchronous control will be described. FIG. 12 is a detailed flowchart of Step S107, and FIG. 13 is a chart describing a mechanism of the asynchronous control.

In Step S105, as the surveying instrument 10 completes rotation toward the GNSS device 85 and transmits a signal for notifying of this to the optical transmitter 73, Step S107 starts. As Step S107 starts, in Step S201, the imaging unit 40 starts imaging at predetermined intervals $T_1$. Images are successively output to the surveying instrument control unit 29. The interval $T_1$ is a time from the start of exposure to the start of exposure for the next frame.

At the same time, in Step S202, the optical transmitter control unit 77 activates the light source 74 and repeats light turning on and off (flashing) at predetermined intervals $T_2$. Specifically, an operation in which light is turned on for a time $2T_1$ corresponding to two frames of the imaging intervals, and light is turned off for the same time $2T_1$, is repeated. Therefore, the predetermined interval $T_2$ is $4T_1$.

Next, in Step S203, the surveying instrument control unit 29 generates a difference image in sequence by subtracting, from an image imaged in a current frame, an image imaged two frames before Imaging and light emission are performed at such timings, and difference images of four frames are defined as one set which includes two ON-OFF difference images (1 and 2 in FIG. 13) obtained by subtracting images imaged when light is off from images imaged when light is on, and two OFF-ON difference images (3 and 4 in FIG. 13) obtained by subtracting images imaged when light is on from images imaged when light is off. The surveying instrument control unit 29 defines the images of four frames as one set and always monitors synchronization points.

Next, in Step S204, the surveying instrument control unit 29 generates an average image when three sets of images of the synchronization points are generated. The number of sets to be averaged is not limited to 3, but is preferably 3 from the viewpoint of a delay from the imaging time and the calculation accuracy.

Next, in Step S205, the surveying instrument control unit 29 detects a figure of the tracking guide light Lc from the generated average image, calculates a direction of the tracking guide light Lc, and ends the processing.

Here, the use of an average image for calculation of the direction of the tracking guide light Lc is to improve the calculation accuracy. However, the use of an average image is not always necessary. For example, when an operator holding the target unit 70 uses the prism lock-on function while he/she is moving, a direction of the tracking guide light Lc may be calculated from one set of difference images without using an average image. This is because, when an average image is used, a time from imaging to calculation of the average image will be delayed, and a deviation will occur in the calculated direction.

Whether a difference image is ON-OFF or OFF-ON can be grasped by an image analysis from a level of brightness peak. For calculation of an arrival direction of the tracking guide light Lc, an ON-OFF difference image is preferably used. This is because a delay from imaging can be reduced.

As described later, by synchronizing imaging and light turning-on timings, difference image calculation needs to be performed just one time. On the other hand, in the method described above, at least four difference images are generated, so that the amount of calculation increases, however, this poses no problem since the increase in amount of calculation can be suppressed by reducing the number of pixels to ¼ by binning.

The present embodiment is configured so that imaging is performed four times in one cycle including a light turned-on time corresponding to two frames of imaging intervals $T_1$ and a light turned-off time corresponding to two frames. Therefore, as illustrated in FIG. 14, even when one imaging accidentally performed at the time of a light turning-on operation or light turning-off operation is included in one cycle, another one imaging in the one cycle can be performed without fail at a timing that causes an ON-OFF difference image to be generated. The lengths of the light turned-on time and the light turned-off time may not be exactly twice the imaging interval $T_1$. This is because the light turning-on timing always delays due to a clock error or the like.

A configuration may be made in which, the light turned-on time and the light turned-off time are not limited to twice the imaging interval, but is set to n times (here, n is a natural number of 2 or more, n=2, 3, . . . ) and images of 2×n frames are defined as one set, and a difference image between an image imaged in a current frame and an image acquired n frames after the current frame is acquired. However, n=2 is advantageous because the delay from imaging is minimized

7. Modification 1

Figure 15:
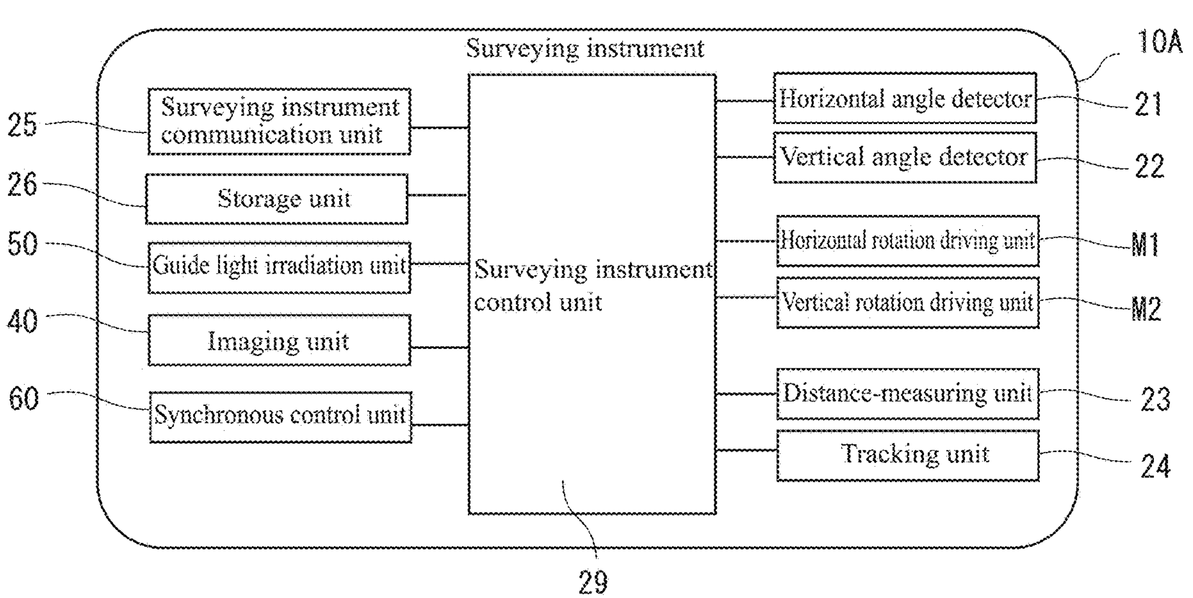
FIG. 15 is a block diagram of a surveying instrument constituting a survey system according to a modification of the embodiment described above.

FIG. 15 is a block diagram of a surveying instrument 10A constituting a survey system 1A according to Modification 1. In the survey system 1A, the surveying instrument performs synchronous control to synchronize imaging timings and light turning-on timings and acquires images when light is turned on and turned off, although the survey system 1 matches imaging timings of the imaging unit 40 with light turning-on timings of the optical transmitter 73 by asynchronous control.

For this, in the survey system 1A, in addition to the configuration of the surveying instrument 10, the surveying instrument 10A includes a synchronous control unit 60. The synchronous control unit 60 performs a control to transmit a synchronization signal to the imaging unit 40 and the optical transmitter 73 to synchronize imaging timings and light turning-on timings, and acquire images when light is off and on. Accordingly, one difference image can be acquired by performing imaging just once when light is turned off and performing imaging just once when light is turned on.

By this synchronous control of imaging and light turning-on, as with the survey system 1, it is also possible to acquire a difference image between when light is off and when light is on and realize the prism lock-on function. This modification is also applicable to survey systems according to other modifications described in this description.

8. Modification 2

As Modification 2, another example of processing of the prism lock-on function of the survey system 1 will be described.

Figure 17:
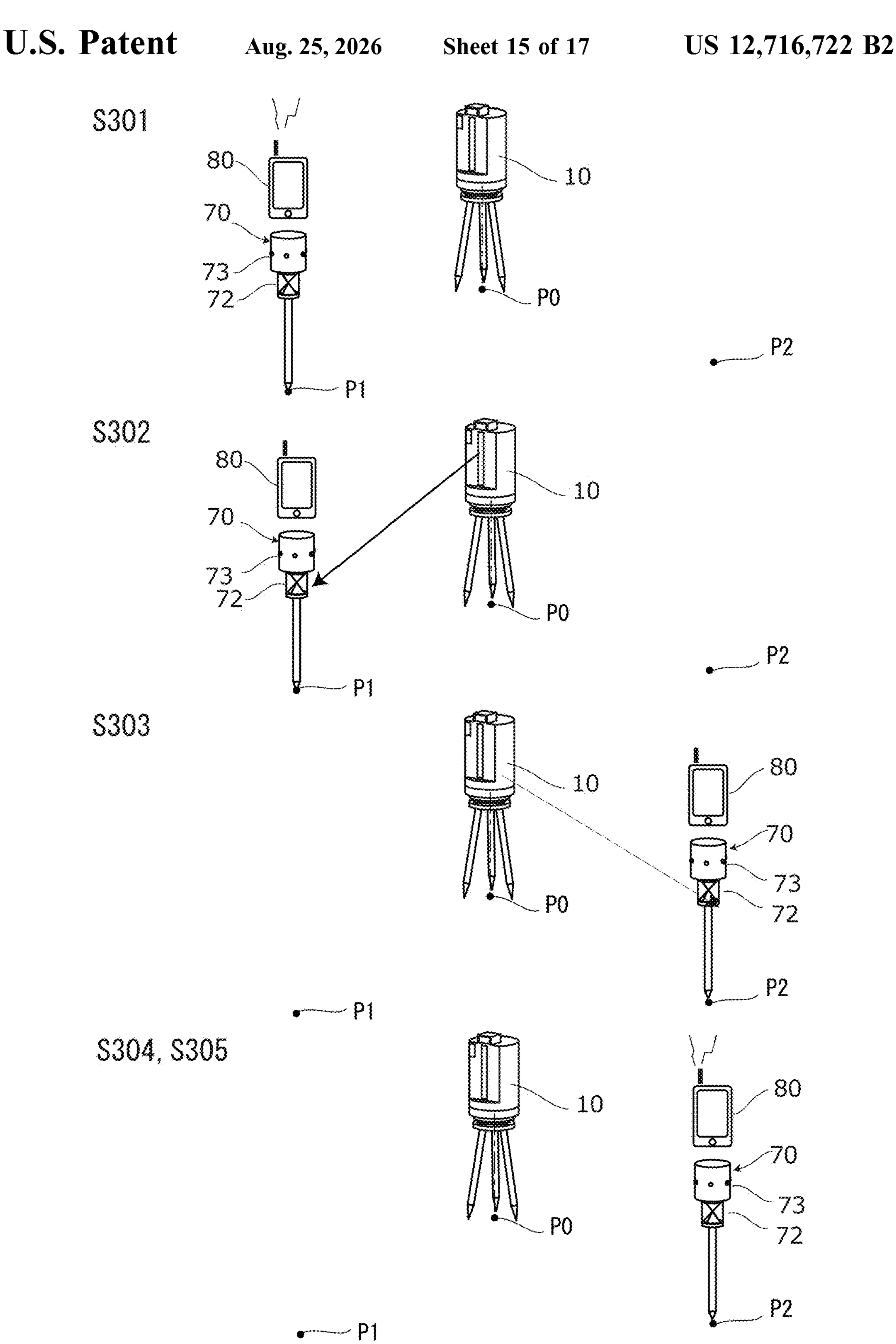
FIG. 17 is an image view of a previous process of the prism lock-on function described above.

FIG. 16 illustrates a flowchart of processing of the prism lock-on function according to Modification 2. In this flow, Steps S306 to S311 are the same as Steps S105 to S110 in FIG. 9, and description thereof is omitted. FIG. 17 is an image view of Steps S301 to S305.

When a previous process starts, in Step S301, at a point P1 away from the point P0 that is an installation point of the surveying instrument 10, position information (latitude and longitude) at the point P1 is acquired by the GNSS device 85 of the controller 80. The position information at the point P1 is stored in the storage unit 83.

Next, in Step S302, the surveying instrument 10 is caused to measure (measure at least angles of) the prism 72. Collimation of the surveying instrument 10 to the prism 72 at the point P1 enables use of a function, for example, scanning by the tracking unit 24, etc., different from the automatic tracking function and the prism lock-on function. A measurement result of the point P1 is transmitted to the controller 80. The order of Steps S301 and S302 is not limited.

Next, in Step S303, the operator holds the target unit 70 and moves to a point P2 relatively distant from the point P1 in a state where the prism 72 is automatically tracked, and then, sets the target unit 70 at the point P2 and causes the surveying instrument 10 to measure the prism 72 (angle measurement). A measurement result at the point P2 is transmitted to the controller 80.

Next, in Step S304, the controller 80 is positioned proximal to the surveying instrument 10, and position information (latitude and longitude) at the point P2 is acquired by the GNSS device 85. The position information at the point P2 is stored in the storage unit 83. The order of S303 and S304 is not limited.

Then, in Step S305, the controller control unit 89 calculates the surveying instrument installation point P0 based on position information at the point P1 and the point P2 and an angle from the point P1 to the point P2 with respect to the surveying instrument 10 acquired from the surveying instrument 10, and stores the calculation result in the storage unit 83. Accordingly, the controller control unit 89 can grasp a direction angle of the point P1 or the point P2 with respect to the surveying instrument 10. This direction angle is transmitted to the surveying instrument 10. Based on this, the surveying instrument control unit 29 matches an azimuth of the controller 80 and the reference of the collimation direction of the surveying instrument 10. Accordingly, when the operator further moves to another arbitrary point, based on position information at this arbitrary position acquired by the GNSS device 85, a relative angle (azimuth) of the GNSS device 85 with respect to the surveying instrument 10 can be calculated.

This method has the advantage that it is unnecessary to return to the position of the surveying instrument 10 and perform positional alignment although the prism 72 has to be measured twice. The method in FIG. 9 and the method in FIG. 16 can be changed as necessary. This modification is also applicable to survey systems according to other modifications described in this description.

9. Modification 3

Figure 18:
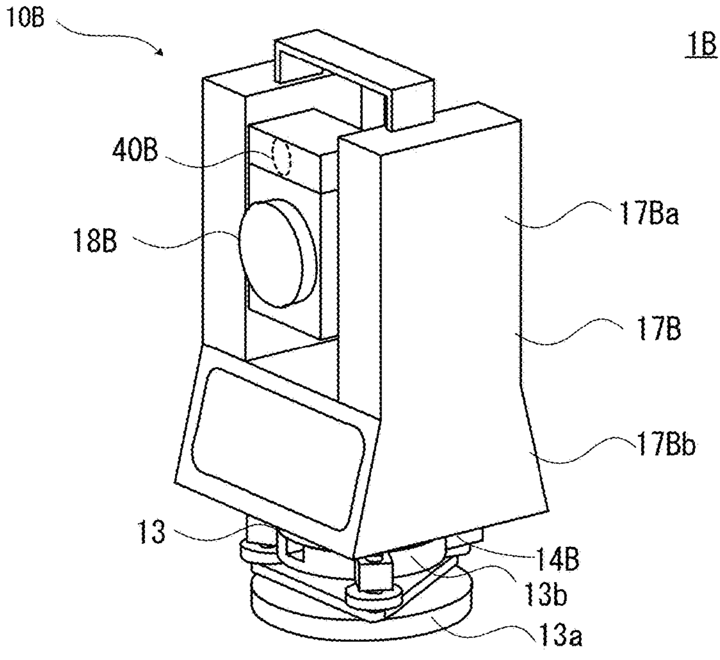
FIG. 18 is an external perspective view of a surveying instrument constituting a survey system according to still another modification.
Figure 19:
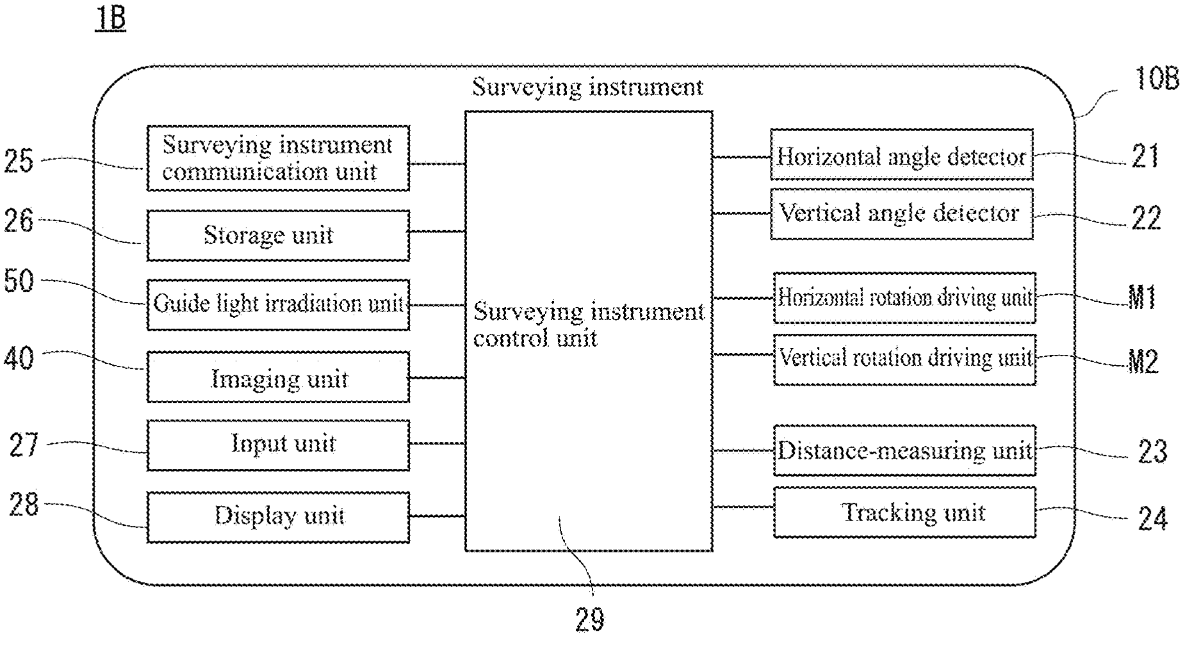
FIG. 19 is a configuration block diagram of the same surveying instrument.

FIG. 18 is a schematic external perspective view of a surveying instrument 10B constituting a survey system 1B according to Modification 3, and FIG. 19 is a configuration block diagram. The survey system 1B has the same configuration except for including the surveying instrument 10B in place of the surveying instrument 10, so that detailed overall description is omitted. The surveying instrument 10B has a configuration functionally equivalent to that of the surveying instrument 1, but has following differences in appearance. The surveying instrument 10B does not include the cover member 16. In addition, a bracket portion 17B fixed onto the rotary base 14 provided on the base portion 13 and rotatable in the horizontal direction has an independent casing having a U shape open upward.

A lower portion 17Bb of the bracket portion 17B has a horizontally-long rectangular parallelepiped shape, and includes, on its front surface, an input unit 27 for directly operating the surveying instrument 1B and a display unit 28. An upper portion 17Ba of the bracket portion 17B extends upward as a pair of left and right columns, and between the columns, a telescope 18B is supported in a vertically rotatable manner around a shaft H. On an upper portion of the telescope 18B, an imaging unit 40B having a configuration equivalent to that of the imaging unit 40 is provided.

That is, as a main difference between the surveying instrument 10 and the surveying instrument 10B, the imaging unit 40 is provided at an upper end of the bracket portion 17 and rotates only in the horizontal direction in the surveying instrument 10, and on the other hand, in the surveying instrument 10B, the imaging unit 40B is provided on an upper portion of the telescope 18B and is rotatable in the horizontal direction and the vertical direction together with the telescope 18B.

On the other hand, as illustrated in FIG. 19, the surveying instrument 10 and the surveying instrument 10B are configured functionally equivalent to each other except that the surveying instrument 10B includes the input unit 27 and the display unit 28.

Figure 20:
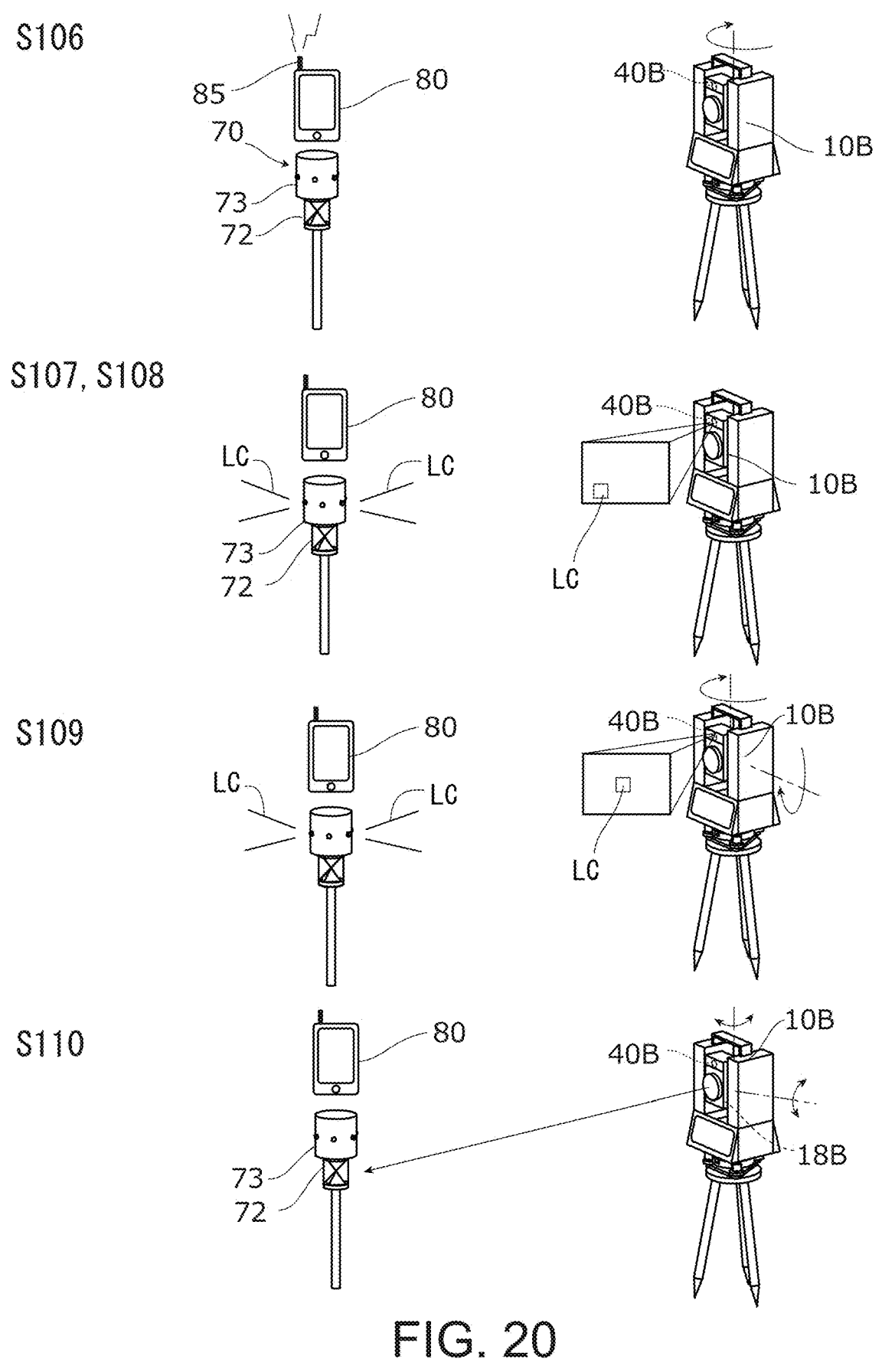

A flow of prism lock-on using the survey system 1B is generally the same as the flow of the survey system 1 illustrated in FIG. 9. Based on the above-described configuration differences, operations in Steps S108 and S109 in the main process are different as illustrated in FIG. 20. That is, in Step S108, the surveying instrument control unit 29 calculates an arrival direction of the tracking guide light Lc based on a result of image analysis, drives the horizontal rotation driving unit M1 and the vertical rotation driving unit M2 to rotate the telescope 18, and directs the collimation axis of the telescope 18 toward the arrival direction of the tracking guide light Lc (accurate direction of the prism 72). According to calculation of the arrival direction of the tracking guide light Lc, not only a horizontal angle but also a vertical angle to which the telescope should be rotated can be grasped.

Therefore, in Step S109, scanning is performed by tracking light of the tracking unit 24, and when capturing the prism 72, the prism 72 can be captured just by slightly scanning the periphery of a current collimation direction in the vertical direction and the horizontal direction.

As described above, in the surveying instrument 10B including the imaging unit 40 rotatable together with the telescope 18B, the telescope 18 is rotated in the horizontal direction and the vertical direction at a time and directed toward an accurate direction of the prism 72, so that the telescope 18 can more quickly capture the prism.

A preferred embodiment and modifications of the present invention have been described above, and the embodiment and modifications described above are just examples of the present invention, and these can be combined based on knowledge of a person skilled in the art, and such a combined embodiment is also included in the scope of the present invention.

REFERENCE SIGNS LIST

1, 1A, 1B: Survey system
10, 10A, 10B: Surveying instrument
14, 14B: Rotary base
16: Cover member
16*d*: Imaging window
17, 17B: Bracket portion
17*a*: Support member
18, 18B: Telescope
24: Tracking unit
28: Display unit
29: Surveying instrument control unit
40, 40B Imaging unit
42: Lens
46*a*: Image
46*b*: Image
46*c*: Difference image
47: FIG.
47*c*: Tracking guide light
70: Target unit
72: Prism
73: Optical transmitter
77: Optical transmitter control unit
80: Controller
85: GNSS device
89: Controller control unit
A: Central axis
Lc: Tracking guide light
M1: Horizontal rotation driving unit
M2: Vertical rotation driving unit
V: Axis

The invention claimed is:

1. A survey system comprising:
a surveying instrument including
a survey unit having a light emitting element to transmit distance-measuring light to a target, and a light receiving element to receive the distance-measuring light reflected, and configured to measure a distance and angles of the target,
a tracking unit having a light emitting element to transmit tracking light to the target and a light receiving element to receive the tracking light reflected, and configured to detect a position of the target and automatically track the target,
a telescope storing optical systems of the survey unit and the tracking unit,
a horizontal rotation driving unit configured to rotate the telescope in the horizontal direction and a vertical rotation driving unit configured to rotate the telescope in the vertical direction,
an imaging unit configured to acquire an image of a landscape in front of the telescope, and at least one first processor configured to control the survey unit, the tracking unit, the horizontal rotation driving unit, the vertical rotation driving unit, and the imaging unit;

a controller including a GNSS device configured to acquire position information of the device itself based on a navigation signal, and at least one second processor configured to remotely operate the surveying instrument; and a target unit including the target and an optical transmitter configured to emit tracking guide light, wherein the first processor and the second processor are capable of communicating with each other and function as a system control unit, the system control unit is enabled to calculate an azimuth of the GNSS device at an arbitrary point with respect to the surveying instrument based on position information acquired by the GNSS device at an installation point of the surveying instrument as a first point, position information acquired by the GNSS device at a second point away from the first point, and an azimuth from the surveying instrument to the second point acquired by the surveying instrument by measuring angles to the target set at the second point, the system control unit rotates the telescope in the horizontal direction toward the GNSS device based on a difference between an azimuth of the GNSS device at a current position with respect to the surveying instrument calculated from position information acquired by the GNSS device at the current position and an azimuth of a current collimation direction of the telescope, the first processor causes the imaging unit to acquire images when the optical transmitter turns off light and turns on light, calculates an arrival direction of the tracking guide light from a difference image between the images, and rotates the telescope toward the arrival direction, and by scanning the periphery by the tracking unit, the first processor captures the target and locks on the target.

2. The survey system according to claim 1, wherein the optical transmitter emits light all around a central axis of a target support member supporting the target along a plane orthogonal to the central axis.

3. The survey system according to claim 2, wherein the imaging unit repeats image acquisition at predetermined imaging intervals, the optical transmitter repeats flashing at intervals n times the imaging intervals, provided that n is a natural number of 2 or more, and the difference image is a difference image obtained by subtracting, from an image imaged at a certain timing, an image imaged n frames before the certain timing.

4. The survey system according to claim 1, wherein the imaging unit repeats image acquisition at predetermined imaging intervals, the optical transmitter repeats flashing at intervals n times the imaging intervals, provided that n is a natural number of 2 or more, and the difference image is a difference image obtained by subtracting, from an image imaged at a certain timing, an image imaged n frames before the certain timing.

5. The survey system according to claim 4, wherein the first processor monitors, as a synchronization point, a timing that is for imaging the image imaged at the certain timing so that the image becomes the image imaged when the optical transmitter is on light, and the image imaged n frames before the certain timing becomes the image imaged when the optical transmitter is off light in imaging for obtaining the difference image, and calculates the arrival direction of the tracking guide light from an average image of the difference images at a plurality of successive synchronization points.

6. The survey system according to claim 4, wherein the n is 2.

7. The survey system according to claim 1, wherein scanning by the tracking unit is performed so as to preferentially scan a position in the vertical direction grasped from the arrival direction of the tracking guide light obtained from the difference image.

8. The survey system according to of claim 1, wherein the surveying instrument further includes a rotary base including the horizontal rotation driving unit, a bracket portion erected on the rotary base and configured to support the telescope in a vertically rotatable manner, and a cover member storing the telescope, the bracket portion, and the imaging unit which is disposed at an upper end of the bracket portion in a space defined between the cover member and the rotary base, and in a front surface of the cover member, a window extending in the up-down direction is provided at a center, and an imaging window configured not to obstruct a field of view of the imaging unit is provided at an upper portion, and the imaging unit is a wide-angle camera including a wide-angle lens.

9. A survey system comprising:

a surveying instrument including a survey unit having a light emitting element to transmit distance-measuring light to a target and a light receiving element to receive the distance-measuring light reflected, and configured to measure a distance and angles of the target, a tracking unit having a light emitting element to transmit tracking light to the target and a light receiving element to receiving the tracking light reflected, and configured to detect a position of the target and automatically track the target, a telescope storing optical systems of the survey unit and the tracking unit, a horizontal rotation driving unit configured to rotate the telescope in the horizontal direction and a vertical rotation driving unit configured to rotate the telescope in the vertical direction, an imaging unit configured to acquire an image of a landscape in front of the telescope, and at least one first processor configured to control the survey unit, the tracking unit, the horizontal rotation driving unit, the vertical rotation driving unit, and the imaging unit;

a controller including a GNSS device configured to acquire position information of the device itself based on a navigation signal, and at least one second processor configured to remotely operate the surveying instrument; and a target unit including the target and an optical transmitter configured to emit tracking guide light, wherein the first processor and the second processor are capable of communicating with each other, and function as a system control unit, the system control unit is enabled to calculate an azimuth of the GNSS device at an arbitrary point with respect to the surveying instrument based on position information acquired by the GNSS device at a first point away from an installation point of the surveying instrument, position information acquired by the GNSS device at a second point away from the first point, and an angle between the first point and the second point with respect to the surveying instrument acquired by respectively measuring angles of the target set at the first point and the second point by the surveying instrument, the system control unit rotates the telescope in the horizontal direction toward the GNSS device based on a difference between an azimuth of the GNSS device at a current position with respect to the surveying instrument calculated from position information acquired by the GNSS device at the current position, and an azimuth of a current collimation direction of the telescope, the first processor causes the imaging unit to acquire images when the optical transmitter turns off light and turns on light, calculates an arrival direction of the tracking guide light from a difference image between the images, and rotates the telescope toward the arrival direction, and by scanning the periphery by the tracking unit, the first processor captures the target and locks on the target.

10. The survey system according to claim 9, wherein the optical transmitter emits light all around a central axis of a target support member supporting the target along a plane orthogonal to the central axis.

11. The survey system according to claim 10, wherein the imaging unit repeats image acquisition at predetermined imaging intervals, the optical transmitter repeats flashing at intervals n times the imaging intervals, provided that n is a natural number of 2 or more, and the difference image is a difference image obtained by subtracting, from an image imaged at a certain timing, an image imaged n frames before the certain timing.

12. The survey system according to claim 9, wherein the imaging unit repeats image acquisition at predetermined imaging intervals, the optical transmitter repeats flashing at intervals n times the imaging intervals, provided that n is a natural number of 2 or more, and the difference image is a difference image obtained by subtracting, from an image imaged at a certain timing, an image imaged n frames before the certain timing.

13. The survey system according to claim 12, wherein the first processor monitors, as a synchronization point, a timing that is for imaging the image imaged at the certain timing so that the image becomes the image imaged when the optical transmitter is on light, and the image imaged n frames before the certain timing becomes the image imaged when the optical transmitter is off light in imaging for obtaining the difference image, and calculates the arrival direction of the tracking guide light from an average image of the difference images at a plurality of successive synchronization points.

14. The survey system according to claim 12, wherein the n is 2.

15. The survey system according to claim 9, wherein scanning by the tracking unit is performed so as to preferentially scan a position in the vertical direction grasped from the arrival direction of the tracking guide light obtained from the difference image.

16. The survey system according to of claim 9, wherein the surveying instrument further includes a rotary base including the horizontal rotation driving unit, a bracket portion erected on the rotary base and configured to support the telescope in a vertically rotatable manner, and a cover member storing the telescope, the bracket portion, and the imaging unit which is disposed at an upper end of the bracket portion in a space defined between the cover member and the rotary base, and in a front surface of the cover member, a window extending in the up-down direction is provided at a center, and an imaging window configured not to obstruct a field of view of the imaging unit is provided at an upper portion, and the imaging unit is a wide-angle camera including a wide-angle lens.

* * * * *